United States Patent
Simon et al.

(10) Patent No.: US 10,652,624 B2
(45) Date of Patent: May 12, 2020

(54) NEXT GENERATION TERRESTRIAL BROADCASTING PLATFORM ALIGNED INTERNET AND TOWARDS EMERGING 5G NETWORK ARCHITECTURES

(71) Applicant: SINCLAIR BROADCAST GROUP, INC., Hunt Valley, MD (US)

(72) Inventors: Michael J. Simon, Frederick, MD (US); Mark A. Aitken, Parkton, MD (US)

(73) Assignee: Sinclair Broadcast Group, Inc., Hunt Valley, MD (US)

( * ) Notice: Subject to any disclaimer, the term of this patent is extended or adjusted under 35 U.S.C. 154(b) by 321 days.

(21) Appl. No.: 15/480,981

(22) Filed: Apr. 6, 2017

(65) Prior Publication Data
US 2017/0295409 A1    Oct. 12, 2017

Related U.S. Application Data

(60) Provisional application No. 62/319,527, filed on Apr. 7, 2016.

(51) Int. Cl.
*G06F 15/16* (2006.01)
*H04N 21/643* (2011.01)
(Continued)

(52) U.S. Cl.
CPC ...... *H04N 21/64322* (2013.01); *H04H 60/07* (2013.01); *H04L 12/5601* (2013.01);
(Continued)

(58) Field of Classification Search
USPC .......... 370/216, 312; 725/33; 709/223, 203, 709/206, 217, 219, 224, 226, 228, 230,
(Continued)

(56) References Cited

U.S. PATENT DOCUMENTS 6,498,937 B1    12/2002  Smith
6,961,388 B2    11/2005  Ling et al.
(Continued)

FOREIGN PATENT DOCUMENTS

CN    105007145 A    10/2015
CN    105007146 A    10/2015
(Continued)

OTHER PUBLICATIONS

English translation for Chinese patent publication No. CN 105007145 A, published Oct. 28, 2015, 17 pages, translated by Google at https://patents.google.com.
(Continued)

*Primary Examiner* — Quang N Nguyen
(74) *Attorney, Agent, or Firm* — Sterne, Kessler, Goldstein & Fox P.L.L.C.

(57) ABSTRACT

A Next Generation Broadcast Platform (NGBP) is disclosed that utilizes 5G software-defined networking (SDN) and network function virtualization (NFV) technologies. The NGBP is designed to enable a new paradigm for broadcasters, wherein the model of fixed wireless spectrum access granted only to the licensees of the spectrum is replaced by a flexible model in which licensed spectrum is pooled together and allocated dynamically to broadcast licensees as well as outside tenants. The NGBP is implemented using SDN/NFV technology, and includes a broadcast market exchange (BMX) entity that allocates the spectrum between tenants based on service level agreements (SLAs) with those users. The NGBP also includes an internet protocol (IP) core and a broadcast centralized radio access network (BC-RAN) which apply the major network functions to broadcaster content in accordance with the determinations of the BMX. The SDN/NFV implementation offers several distinct
(Continued)

advantages over NGBP implemented with dedicated network hardware.

20 Claims, 13 Drawing Sheets

(51) Int. Cl.
| | |
|---|---|
| *H04H 60/07* | (2008.01) |
| *H04N 21/414* | (2011.01) |
| *H04N 21/2383* | (2011.01) |
| *H04N 21/438* | (2011.01) |
| *H04L 12/54* | (2013.01) |
| *H04L 29/06* | (2006.01) |
| *H04L 12/801* | (2013.01) |
| *H04N 21/2381* | (2011.01) |
| *H04W 28/10* | (2009.01) |

(52) U.S. Cl.
CPC ............. *H04L 29/06* (2013.01); *H04L 47/10* (2013.01); *H04N 21/2381* (2013.01); *H04N 21/2383* (2013.01); *H04N 21/41407* (2013.01); *H04N 21/4382* (2013.01); *H04W 28/10* (2013.01)

(58) Field of Classification Search
USPC .................................................. 709/232, 238
See application file for complete search history.

(56) References Cited

U.S. PATENT DOCUMENTS

| | | | |
|---|---|---|---|
| 7,920,884 | B2 | 4/2011 | Agrawal et al. |
| 8,577,299 | B2 | 11/2013 | Agrawal et al. |
| 8,804,675 | B2 | 8/2014 | Gutierrez et al. |
| 9,036,567 | B2 | 5/2015 | Krishnmoorthi et al. |
| 9,043,687 | B2 | 5/2015 | Ko et al. |
| 9,179,440 | B2 | 11/2015 | Gutierrez et al. |
| 9,253,428 | B2 | 2/2016 | Allison, III et al. |
| 9,258,800 | B2 | 2/2016 | Kwak et al. |
| 9,300,327 | B2 | 3/2016 | Ko et al. |
| 9,307,273 | B2 | 4/2016 | Yoo et al. |
| 9,363,040 | B2 | 6/2016 | Ko et al. |
| 9,369,325 | B2 | 6/2016 | Kim et al. |
| 9,386,562 | B2 | 7/2016 | Gutierrez et al. |
| 9,843,845 | B2 | 12/2017 | Aitken et al. |
| 2003/0058890 | A1 | 3/2003 | Ritchie, Jr. et al. |
| 2006/0117341 | A1 | 6/2006 | Park |
| 2009/0163137 | A1 | 6/2009 | Capparelli et al. |
| 2010/0195558 | A1 | 8/2010 | Koskinen |
| 2011/0107379 | A1 | 5/2011 | Lajoie et al. |
| 2012/0188878 | A1 | 7/2012 | Simon |
| 2013/0023285 | A1 | 1/2013 | Markhovsky et al. |
| 2013/0024364 | A1 | 1/2013 | Shrivastava et al. |
| 2013/0170561 | A1 | 7/2013 | Hannuksela |
| 2014/0112274 | A1 | 4/2014 | Moon et al. |
| 2014/0150014 | A1* | 5/2014 | Aitken ................ H04N 21/2381 725/33 |
| 2015/0006586 | A1 | 1/2015 | Mourad et al. |
| 2015/0043491 | A1 | 2/2015 | Eng et al. |
| 2015/0049642 | A1 | 2/2015 | Eng et al. |
| 2015/0055727 | A1 | 2/2015 | Kim et al. |
| 2015/0085735 | A1* | 3/2015 | Shelby ..................... H04L 65/80 370/312 |
| 2015/0181281 | A1 | 6/2015 | Ko et al. |
| 2015/0195067 | A1 | 7/2015 | Kim et al. |
| 2015/0236884 | A1 | 8/2015 | Suh et al. |
| 2015/0304070 | A1 | 10/2015 | Baek et al. |
| 2015/0326448 | A1* | 11/2015 | Chaudhary ............ G06Q 20/14 709/223 |
| 2015/0358106 | A1 | 12/2015 | Limberg et al. |
| 2016/0057504 | A1 | 2/2016 | Shelby et al. |
| 2016/0094970 | A1 | 3/2016 | Oh et al. |
| 2016/0105223 | A1 | 4/2016 | Baek et al. |
| 2016/0119908 | A1 | 4/2016 | Kwak et al. |
| 2016/0127169 | A1* | 5/2016 | Rosa De Sousa Teixeira ............. H04L 41/5025 370/216 |
| 2016/0164541 | A1 | 6/2016 | Ko et al. |
| 2016/0164637 | A1 | 6/2016 | Suh et al. |
| 2016/0165273 | A1 | 6/2016 | Moon et al. |
| 2016/0165274 | A1 | 6/2016 | Moon et al. |
| 2016/0173312 | A1 | 6/2016 | Moon et al. |
| 2016/0191288 | A1 | 6/2016 | Baek et al. |
| 2016/0198217 | A1 | 7/2016 | Ko et al. |
| 2016/0212626 | A1 | 7/2016 | Simon et al. |
| 2016/0241358 | A1 | 8/2016 | Ko et al. |
| 2016/0241365 | A1 | 8/2016 | Bae et al. |
| 2016/0328252 | A1* | 11/2016 | Singh ..................... G06F 9/455 |
| 2017/0230267 | A1* | 8/2017 | Armolavicius ..... H04L 43/0882 |
| 2018/0098132 | A1 | 4/2018 | Aitken et al. |

FOREIGN PATENT DOCUMENTS

| | | |
|---|---|---|
| CN | 105024791 A | 11/2015 |
| CN | 105024952 A | 11/2015 |
| CN | 105024963 A | 11/2015 |
| CN | 105245479 A | 1/2016 |
| CN | 105282076 A | 1/2016 |
| CN | 105282078 A | 1/2016 |
| CN | 105323048 A | 2/2016 |
| CN | 105743624 A | 7/2016 |
| CN | 105991266 A | 10/2016 |
| CN | 105991495 A | 10/2016 |
| CN | 105991498 A | 10/2016 |
| CN | 105991500 A | 10/2016 |
| CN | 105991501 A | 10/2016 |
| CN | 105991502 A | 10/2016 |
| WO | WO 2015/187965 A1 | 12/2015 |

OTHER PUBLICATIONS

English translation for Chinese patent publication No. CN 105007146 A, published Oct. 28, 2015, 17 pages, translated by Google at https://patents.google.com.

English translation for Chinese patent publication No. CN 105024791 A, published Nov. 4, 2015, 14 pages, translated by Google at https://patents.google.com.

English translation for Chinese patent publication No. CN 105024952 A, published Nov. 4, 2015, 20 pages, translated by Google at https://patents.google.com.

English translation for Chinese patent publication No. CN 105024963 A, published Nov. 4, 2015, 23 pages, translated by Google at https://patents.google.com.

English translation for Chinese patent publication No. CN 105245479 A, published Jan. 13, 2016, 28 pages, translated by Google at https://patents.google.com.

English translation for Chinese patent publication No. CN 105282076 A, published Jan. 27, 2016, 21 pages, translated by Google at https://patents.google.com.

English translation for Chinese patent publication No. CN 105282078 A, published Jan. 27, 2016, 24 pages, translated by Google at https://patents.google.com.

English translation for Chinese patent publication No. CN 105323048 A, published Feb. 10, 2016, 26 pages, translated by Google at https://patents.google.com.

English translation for Chinese patent publication No. CN 105743624 A, published Jul. 6, 2016, 38 pages, translated by Google at https://patents.google.com.

English translation for Chinese patent publication No. CN 105991266 A, published Oct. 5, 2016, 29 pages, translated by Google at https://patents.google.com.

English translation for Chinese patent publication No. CN 105991495 A, published Oct. 5, 2016, 21 pages, translated by Google at https://patents.google.com.

English translation for Chinese patent publication No. CN 105991498 A, published Oct. 5, 2016, 56 pages, translated by Google at https://patents.google.com.

(56) References Cited

OTHER PUBLICATIONS

English translation for Chinese patent publication No. CN 105991500 A, published Oct. 5, 2016, 40 pages, translated by Google at https://patents.google.com.
English translation for Chinese patent publication No. CN 105991501 A, published Oct. 5, 2016, 44 pages, translated by Google at https://patents.google.com.
English translation for Chinese patent publication No. CN 105991502 A, published Oct. 5, 2016, 25 pages, translated by Google at https://patents.google.com.
Earnshaw, M. et al, "Physical Layer Framing for ATSC 3.0," *IEEE Transactions on Broadcasting*, vol. 62, No. 1, Mar. 2016, pp. 263-270.
Gómez-Barquero, D. and Caldwell, M.W., "Broadcast Television Spectrum Incentive Auctions in the U.S.: Trends, Challenges, and Opportunities," *IEEE Communications Magazine*, vol. 53, No. 7, Jul. 2015, pp. 50-56.
He, D. et al., "System Discovery and Signaling Transmission Using Bootstrap in ATSC 3.0," *IEEE Transactions on Broadcasting*, vol. 62, No. 1, Mar. 2016, pp. 172-180.
Simon, M. and Aitken, M., "An Overview of the North American ATSC M/H Mobile Broadcasting System and its Next-Generation ATSC 3.0," in *Next Generation Mobile Broadcasting*, Boca Raton, FL, USA: CRC Press, 2013, pp. 91-121.
International Search Report and Written Opinion, dated Jul. 17, 2017, for PCT Appl. No. PCT/US2017/026368, 11 pages.

\* cited by examiner

NEXT GENERATION TERRESTRIAL BROADCASTING PLATFORM ALIGNED INTERNET AND TOWARDS EMERGING 5G NETWORK ARCHITECTURES

CROSS-REFERENCE TO RELATED APPLICATIONS

This application claims priority to U.S. provisional application Ser. No. 62/319,527 filed on Apr. 7, 2016. This application is also related to co-pending applications Ser. No. 14/092,993, filed on Nov. 28, 2013, Ser. No. 14/498,845, filed on Sep. 26, 2014, and Ser. No. 15/001,014, filed on Jan. 19, 2016. The contents of the aforementioned applications are incorporated herein by reference in their entirety.

BACKGROUND

Field

This disclosure generally relates to terrestrial television broadcast transmission and in particular to a new paradigm for spectrum use in television broadcasting using 5G technologies.

Background Art

Today, one serious obstacle in advancing and expanding capabilities of terrestrial broadcasting is the continued use of the typical legacy terrestrial broadcast system architecture, a remnant of the 1940s when TV broadcast signals used a sole-purpose, exclusive "language" reserved for and peculiar to television only and emanated exclusively from a single transmitter to a roof-mounted or television set receive antenna (rabbit ears). This simple architecture, limited by both the market for television broadcasting and the technology of the era, satisfied the consumer expectations, and television broadcasting was born and prospered in the United States.

The seven decades that followed led to an evolution of communications systems to a radically more fragmented electronic distribution platform environment where broadcasting's one-to-many architecture was supplemented first with cable and satellite delivery and then through an outgrowth of the wireline telephone's unicast, "one-to-one" service model that expanded into a wireless, cell phone platform in the 1980s. The recent so-called 'cord-cutter' phenomenon has moved many consumers of traditional broadcast television service (either received over-the-air or via cable/satellite/telecom providers) towards time-delayed or on-demand services that only require a wired, high speed, Internet line or simple cell phone service. Even for live television such as sporting events, which were traditionally served by broadcast television services, streaming services may now be served over a simple Internet connection. This evolution has changed the business model and market share of traditional over-the-air broadcasters.

Meanwhile, for consumers of both Internet services such as on-demand and streamed offerings, Internet providers are increasingly targeting mobile devices. Services are now driven by diverse consumer expectations for immediate news, information, entertainment and life-line services on numerous devices anywhere. Therefore, more consumers are attached to their mobile devices as sources for this entertainment, and so-called 3G and 4G services such as Universal Mobile Telecommunications Service (UMTS) and Long-Term Evolution (LTE) have evolved to serve these needs.

Additionally, the increased demand for two-way wireless services has also created the need for new strategies to allow for the more efficient uses of wireless spectrum. The Federal Communications Commission (FCC) has, as a primary mission, efficient allocation of spectrum for related uses. It regularly assesses its allocation table and modifies permitted uses so as to meet evolving consumer demands. As part of that mission, the Commission made an assessment that wireless broadband uses would grow rapidly and wireless broadband providers required significant additional spectrum to meet that expected demand. It reevaluated the amount of spectrum allocated to over-the-air broadcasting and determined that, through the implementation of digital technologies, it could efficiently repack existing broadcast station licenses into a designated reduced spectrum band and create an incentive structure to entice some broadcast licensees to exit the industry, by encouraging broadcast licensees to voluntarily relinquish spectrum usage rights in exchange for a share of the proceeds from an auction of new licenses to use the repurposed spectrum. Initially described in the 2010 National Broadband Plan and authorized by Congress in 2012, the auction was designed to use market forces to align the use of broadcast spectrum with future consumer demands for video and broadband services. The intent of the auction framers was to preserve a robust broadcast TV industry while re-designating some spectrum to be used for wireless telecommunications services on a one-to-one basis. By making valuable "low-band" airwaves (600 MHz band) available for wireless broadband use, the incentive auction is premised on providing benefits to consumers by easing congestion on wireless networks, laying the groundwork for (5G) wireless services and applications, and spurring job creation and economic growth. The auction began on Mar. 29, 2016, and is slated for completion by the second quarter of 2017.

Broadcasters have transitioned from analog to digital transmission standards during the lifetime of television. Recent changes to the digital standard enable broadcasters to offer many of the same services now offered exclusively by traditional wireline and wireless carriers. The new standard, which is in the process of official confirmation by the Advanced Television Systems Committee (ATSC), will provide significant enhancements in data delivery (including television programming) to fixed and mobile devices. At the same time, the legacy broadcast system architecture remains. This legacy architecture is now a serious impediment to the vision of broadcasters using their licensed spectrum to serve their local communities effectively in the future in a competitive market. To adapt to the changing market circumstances for content delivery, there is a need for local broadcasters to be empowered by a new system architecture to better serve their local communities and help satisfy the media consumption expectation of consumers in the future. The new system architecture should also take advantage of new technologies to improve the efficiency with which broadcasters utilize their licensed bands.

BRIEF SUMMARY

To address the issues discussed above, the current disclosure describes a Next Generation Broadcast Platform (NGBP) using 5G technologies that enables a new paradigm in broadcasting in which wireless spectrum is pooled and allocated to potential tenants based on competitive auctioning of the pooled spectrum. The NGBP is implemented on data centers using software-defined networking (SDN). Network function virtualization (NFV) systems proven by global web-scale IT players and now being proposed in 5G network architectures may also be used to enable a centralized, economic implementation of the NGBP, which also allows for future interaction and interworking with other networks, such as mobile telecommunications networks.

In an embodiment, a NGBP system is described, the purpose of which is to facilitate a new paradigm for broadcast communications wherein the licensed spectrum of traditional over-the-air broadcasters is combined into a "shared spectrum pool" (under business agreement from the broadcasters that transmit the licensed spectrum), where portions of the shared spectrum pool can be utilized by broadcasters dynamically in order to suit the needs of the services that the broadcasters as a group or individually wish to provide.

In an embodiment, the NGBP comprises two main entities, an internet protocol (IP) core network and a broadcast transmission network, sometimes called a "single frequency network" (SFN), which are implemented today using dedicated hardware. The IP core network receives IP data from broadcast licensees and outside tenants in the form of IP flows that are associated with a virtual construct termed "physical layer pipes" (PLPs) and applies network functions to them as necessary to meet the service demands. The outside tenants represent content providers that may not have licensed spectrum at their disposal, but may wish to "rent" spectrum, which is a commodity. The IP core network contains a "broadcast market exchange" (BMX) entity that manages spectrum and receives/transmits control plane signaling from the broadcast licensees and outside tenants, and determines what spectrum allocations are released from the shared spectrum pool over time and what network functions are to be applied to the PLPs based on pre-established service level agreements (SLAs) that the NGBP may have with the broadcast licensees and tenants. The IP core network then sends the provisioned PLP and control plane signaling to the remotely-located SFN comprising a defined modulator that performs digital and analog signal processing to generate waveforms (e.g., an analog signals) and transmitters that broadcast those waveforms to broadcast customers. The modulators behave as the slave in a "master-slave combination," where the IP core network determines the modulation parameters (signaling) that the modulators then follow to create the transmittable waveforms.

In another embodiment, 5G technologies, such as software defined networking and network function virtualization (SDN/NFV), are applied to the NGBP to create a centralized and far more flexible system for broadcast. Specifically, a system is described that implements SDN/NFV, where commercial off-the-shelf (COTS) hardware within a data center form virtualized resource pools for computation, storage, and networking resources via a "virtualization layer," software which runs atop the COTS hardware. Virtual Network Functions (VNFs) software can be instantiated on virtual machines that utilize resources from the virtualized resource pools, and perform network functions, including digital baseband processing, in software instead of on specialized, dedicated network hardware.

In several embodiments, an NGBP is described that utilizes SDN/NFV architecture to implement a significantly more flexible system. A virtualized IP core is designed which performs ostensibly the same functions as described, but a Broadcast Central/Cloud—Radio Access Network (BC-RAN) is implemented which implements the digital signal processing portion of the modulation in software using VNFs running atop COTS hardware. Because of this paradigm shift, the digital signal processing is made much more flexible, and allows the NGBP to implement digital signal processing in accordance with various radio access technologies (RATs), such as ATSC 3.0, LTE and UMTS, instead of being locked to a single type of digital processing scheme. The NGBP concatenates several VNFs in a process called PLP service chaining to accomplish the provisioning of computing and spectrum resources in a flexible way.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

Figure 1:
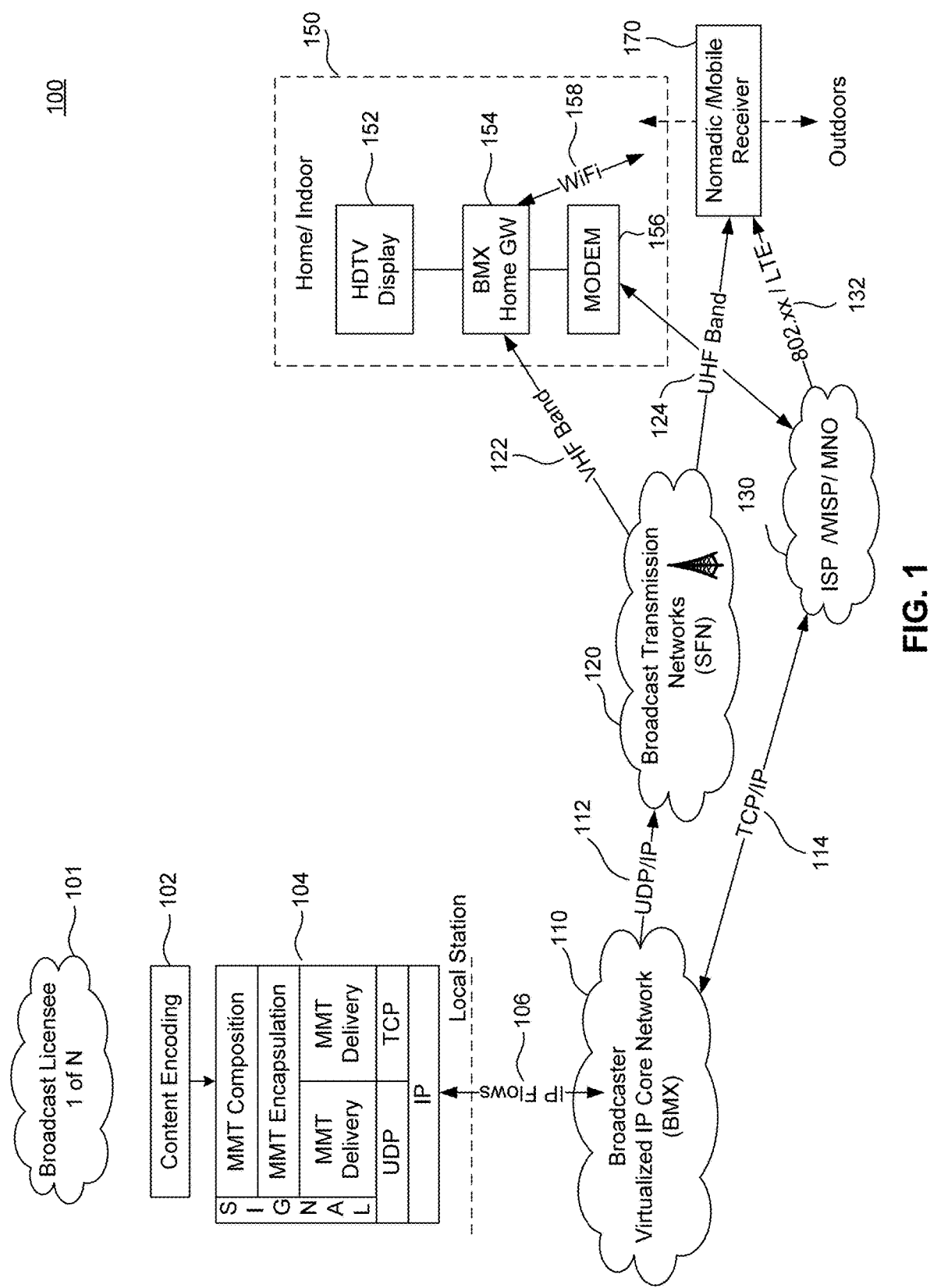
FIG. 1 illustrates an NGBP environment, according to an exemplary embodiment of the present disclosure.

The present disclosure will be described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

As discussed above, the present disclosure presents a system infrastructure for allowing broadcasters to move from the licensed, fixed-channel spectrum access model of old to a new model in which multiple broadcasters use their license spectrum in shared spectrum pool and can adaptively utilize the spectrum to suit their needs based on competitive market mechanisms. Portions of the spectrum pool and accompanying infrastructure resources can also be "rented" to outside tenants that do not own a license to any portion of the shared spectrum pool but want to provide a broadcast service as part of a business model. In the remainder of the present disclosure, broadcasters and outside tenants may both be referred to as "tenants" broadly.

The Next Generation Broadcast Platform

FIG. 1 illustrates a Next Generation Broadcast Platform (NGBP) environment wherein multiple licensed broadcasters efficiently and adaptively utilize a shared spectrum pool to serve the needs of both the licensed broadcasters and other tenants that may wish to utilize the shared spectrum. In an embodiment, the NGBP comprises three main components, a broadcaster virtualized IP core network 110, broadcast transmission network (SFN) 120, and "unicast" transmission network 130 such as an internet service provider (ISP), wireless ISP (WISP), or mobile network operator (MNO). The customer devices being served fall broadly into two categories—stationary receivers 150 and mobile receivers 170. Both the stationary receivers 150 and the mobile receivers 170 may receive both broadcast and unicast transmissions from either the SFN 120 or the unicast network 130. The customer devices may be referred to as "customers" in the remainder of the disclosure.

The broadcast tenants 101 provide internet protocol (IP) flows 106 of their desired content to a broadcaster virtualized IP core network 110. The IP flows 106 may be formatted in any number of formats as desired by the broadcaster. In FIG. 1, the IP flows 106 may contain encoded media content composed and encapsulated using an application layer transport, such as the ISO/IEC 23008-1 MPEG Media Transport (MMT) for delivery of video, audio, and data content, but this is not limiting to the data formats that may be used by the tenants to deliver content to their subscribers.

In an exemplary embodiment, the IP core network 110 contains an entity called the broadcast market exchange (BMX) which offers open market driven mechanisms to enable a tenant to dynamically access a shared spectrum pool and infrastructure to deliver a diversity of services to its customers. The BMX entity, in conjunction with other elements within the IP core network 110, determines the resource allocation released temporally for tenants wishing to access the spectrum pool based on the service level agreements (SLAs) it has with the broadcast tenants 101 and other tenants which may wish to "rent" spectrum resources from the spectrum pool. This system is compatible with legacy service models as well because the BMX can essentially enforce a fixed channel access model if so desired. The BMX will be discussed in greater detail below.

The IP core network 110 also contains a Next Generation Broadcast Gateway (NGB-GW) which pre-processes the IP flows and generates a baseband IP signal 112 using a universal datagram protocol (UDP) or IP format. The baseband IP signal 112 contains both a data plane signal which carries the content from each of the (such as video delivered with MMT) and a control plane signal that dictates an OFDM frame structure to be applied by a modulator within SFN 120. The IP flows of the different broadcasters map directly into reserved resources of virtual physical layer pipe (PLP) structures, each with flexibility in selection of physical layer channel coding, constellation and time interleaving to enable the BMX to control robustness and spectrum efficiency of content delivery to subscribers based on the needs of the tenants. The control plane signal dictates how these different PLPs are mapped onto the actual physical resources of the transmission frame, such as time-frequency resource blocks in an OFDM frame.

The baseband IP signal 112 is transmitted with both the IP flows (virtual PLPs) and control plane signal to a defined modulator and interface contained within SFN 120. The defined modulator interface within the SFN 120 uses the control plane signal of the baseband IP signal to create a baseband digital waveform comprising the appropriately modulated and allocated data from the different virtual PLPs. The baseband digital waveform is then converted to an analog RF waveform (e.g., an analog passband signal), amplified, and carried as a guided wave to the antenna and air interface of the transmitters.

As implied by the baseband IP signal 112 format, the IP core and the SFN may operate in a "master-slave" configuration in which the physical layer resources of the shared spectrum pool are allocated in the IP core network, and the SFN 120 performs the modulation and coding necessary to create the OFDM frames based on the allocation performed in the IP core network. In this way, the SFN network, including its modulation interface and transmitters and antennas, may be located remotely from the IP core. Prior to 5G technology, significant proprietary hardware is required to be implemented at the remote SFN 120, but 5G technologies allow for a further paradigm shift towards a virtualized and centrally located IP core network and physical layer processing called centralized RAN (C-RAN). This will be discussed in more detail below.

Figure 2:
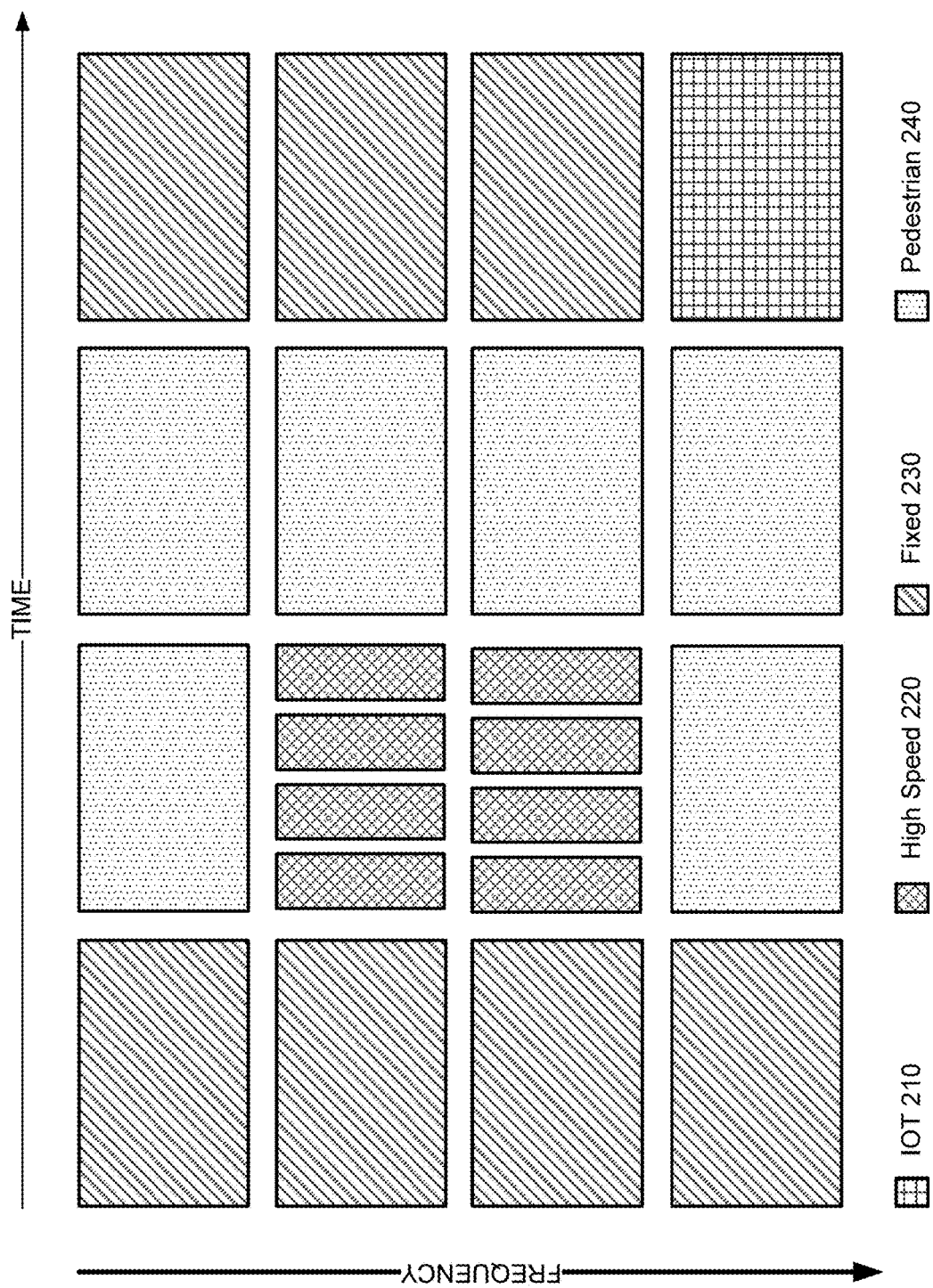
FIG. 2 illustrates a frequency-time block allocation scheme, according to an exemplary embodiment of the present disclosure.

FIG. 2 illustrates a frequency-time block allocation scheme, according to an exemplary embodiment. FIG. 2 shows an example of how the NGBP creates dynamic, adaptive access to the shared spectrum. In FIG. 2, the allocation of different services for different content providers may occur within different frequency bands at different times, with no fixed allocation for any individual content provider. The different allocations represent the different use cases for different customers. For example, the IOT data 210 is generally of smaller volume but may require a robustness to ensure delivery, and thus a single frame of IoT data may occupy a small frequency allocation over some time. The high speed service 220 to serve highly mobile users (such as connected car customers) may use a smaller symbol size to increase sub-carrier spacing and hence increase Doppler (MPH) performance. Other uses may require both robustness and have significant volume, and thus may occupy significant portions for significant time periods, such as the fixed data 230 and the pedestrian data 240. The BMX of the IP core network 110 in FIG. 1 handles the allocation of the spectrum based on the SLAs of the different tenants, where tenants with greater needs may be required to "pay more" for their tenancy. This flexibility in spectrum use and parameterization for the different services is further enabled by the 5G technology implementations, as will be described below.

Figure 3:
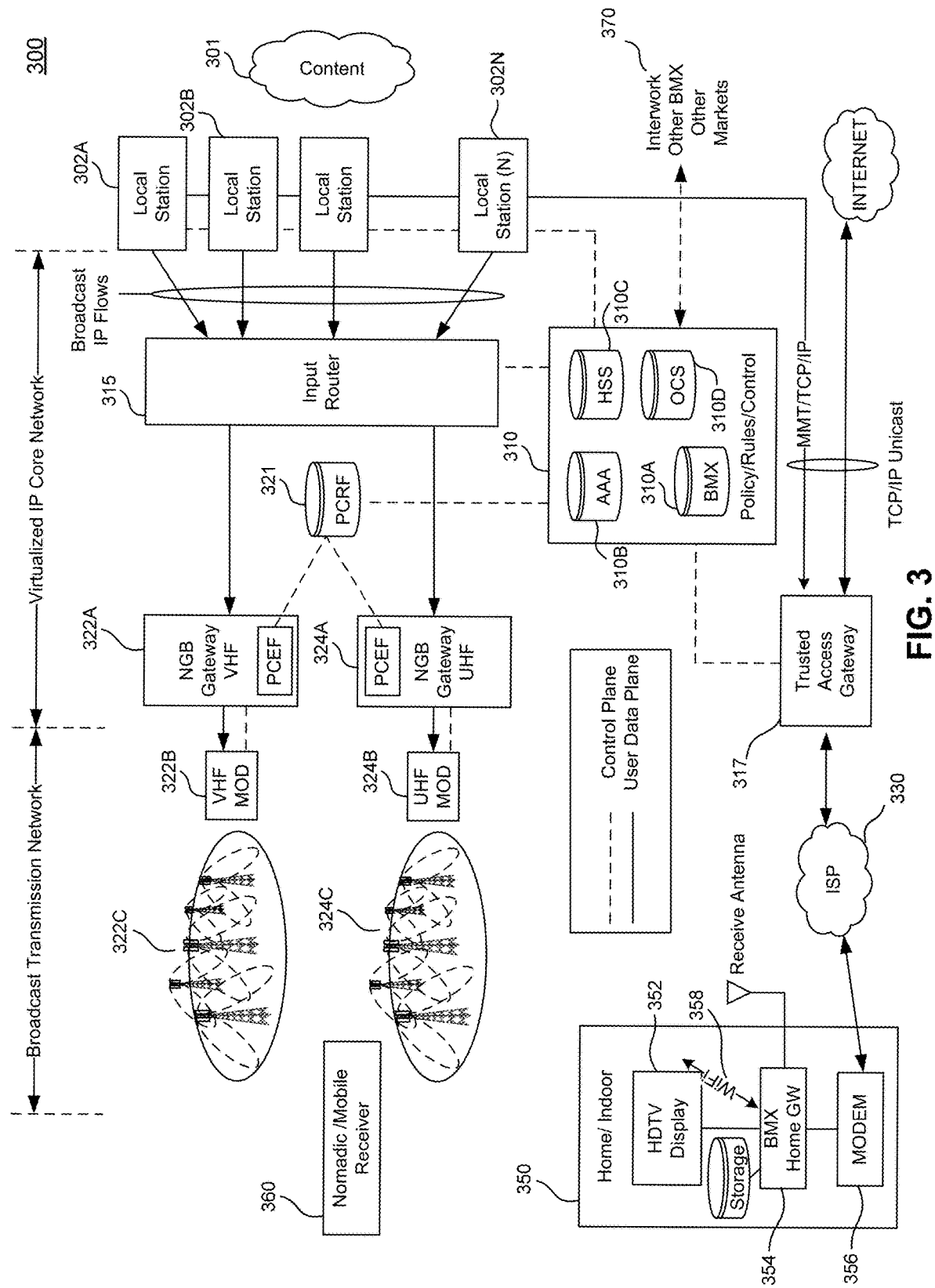
FIG. 3 illustrates an NGBP, according to an exemplary embodiment of the present disclosure.

FIG. 3 illustrates an NGBP according to an example embodiment. As shown in FIG. 3, the NGBP includes a broadcast transmission network and a virtualized IP core network. The broadcast transmission network comprises the defined modulator interfaces 322B and 324B, and transmitters and antennas 322C and 324C, and the ISP 330. In an embodiment, the broadcast transmission network of FIG. 3 comprises the SFN 110 and unicast network 130 as seen in FIG. 1. The virtualized IP core network includes a Policy entity 310 that includes the BMX entity 310A, IP input router 315, Next-Generation Broadcast Gateways (NGB-GWs) 322A and 324A, Policy Control Rules Function (PCRF) 321, and Trusted Access Gateway 317. In an embodiment, the virtualized IP core network of FIG. 3 may be an embodiment of the virtualized IP core network 110 of FIG. 1. The following discussion describes components of NGBP broadcasting in greater detail.

In an embodiment, a policy entity 310 comprises several nodes that control the functionality of the virtualized IP core network. Policy entity 310 contains the broadcast market exchange (BMX) entity 310A, Authentication Authorization Accounting (AAA) 310B, the Home Subscriber Server (HSS) 310C, and On-line charging function (OCS) 310D. BMX entity 310A is the master entity in charge of the assignment and allocation of the shared spectrum pool to the broadcast tenants, depicted as local stations 302A-N in the figure. The BMX entity 310A contains policy rules and service level agreements (SLAs) for each of the tenants, and grants tenants access to the virtualized IP core network via the IP input router 315. As can be seen, the local stations 302A-N contain a control plane link (dotted line) with the policy entity 310. The BMX 310A communicates with the local stations via a defined interface such as a graphical user interface (GUI) hosted at the policy entity 310, and allocates the shared spectrum pool to the IP flows from each of the local stations based on those communications.

The other nodes within policy entity 310 serve functions common to most commercial mobile networks. Home Subscriber Server (HSS) 310C is the main database of the users of NGBP which includes a repository of user data, content consumed, premium services subscribed to, etc. The Authentication Authorization Accounting (AAA) node 310B is a database that determines if users are registered NGBP that may receive and send data over the IP Unicast access network. On-Line Charging System (OCS) 310D tracks SLAs and ensures proper monetary charging for services rendered for both the customers and tenants. Each of these nodes may be implemented in software within a server or data center.

The IP input router 315 receives MMT IP flows from the broadcasters, shown as local stations 302A-N. In an embodiment, the IP input router 315 would be a part of the IP core network, such as IP core network 110 shown in FIG. 1. The broadcasters may have SLAs which are stored in the BMX entity 310A, where the BMX entity 310A then routes the MMT IP Flows to a Next Generation Broadcast Gateway (NGB-GW) 322A and 324A based on the SLAs.

The Next Generation Broadcast Gateways (NGB-GWs) 322A and 324A receive the MMT IP flows from IP input Router 315, as well as control signaling from the BMX entity 310A. In an embodiment, the NGB-GWs are also located within the IP core network, such as IP core network 110 displayed in FIG. 1. The NGB-GWs 322A and 324A pre-process the MMT IP Flows based on the control signaling received from the BMX entity 310A and provide a baseband IP signal output to one of the defined modulator interfaces 322B and 324B in the broadcast transmission network. The baseband signal created in the NGB gateway also contains control plane signaling that allows the gateways to act as "masters" and the modulators as "slaves" to construct a physical layer OFDM frame using the cross-layer control mechanism of the NGB-GWs 322A and 324A. The BMX signals the resources that should be provisioned by the NGB-GWs, and the NGB-GWs perform the actual allocation of the physical layer resources of a transmission frame.

In an embodiment, NGB-GW 322A handles frequencies in the VHF band, while NGB-GW 324A handles allocations in the UHF band. The IP input Router 315, under instruction from the BMX entity 310A, may route an MMT IP flow of a particular station from among the local stations 302A-N to one of the two NGB-GWs based on the SLA with that particular station. For example, if the local station requires a particularly robust signal over a longer range, the MMT IP flow for that local station may be routed to NGB-GW 322A for the VHF band because of the improved propagation characteristics of the lower frequencies in the VHF band. As noted above, each local station is the same as a broadcast tenant or an outside tenant, such as tenants 101 depicted in FIG. 1. The BMX enables flexibility in that spectrum is normalized as to it resources and treated as a commodity and assigned for service with the correct physics (VHF/UHF) in a market driven manner.

Each NGB-GW includes Policy Charging Enforcement Function (PCEF) modules that identify the IP Flows based on real-time deep packet inspection, using MMT Asset ID, for example, to track which broadcasters are utilizing the NGBP. This supports the On-line Charging System (OCS) 310D that tracks usage and charges in accordance with the SLAs of each of the broadcasters and outside tenants. The PCEF also ensures open fair usage of shared spectrum and enables confidence and trust in the BMX by enabling each broadcaster and tenant to see in real-time (via a dash board GUI) the quantity of sub-carriers being used and quality of service (QoS) achieved for their services. The broadcaster account information is available from the BMX exchange via an interface on a secure dash board.

The PCEF modules also interact with the PCRF 321. The PCRF is a node designated to determine policy rules in real-time under the control of the BMX entity. The PCRF 321 may operate at the network core and access the home subscriber server (HSS) and other specialized functions, such as the OCS in the IP Core.

In embodiments, other nodes in the virtualized IP core implement the unicast functionalities of the NGBP. The Trusted Access Gateway (TAG) 317 is used to grant access to authorized users over TCP/IP unicast connections. The TAG uses the AAA that authenticates and authorizes user access from external IP networks (Internet) or unicast MMT/TCP/IP. At the customer site 350, a data modem 356 connects to ISP 330 to provide Over-the-Top (OTT) TCP/IP connectivity to the Home Gateway 354. The BMX/Broadcaster manages the BMX Home Gateway (has SIM card) and can be establish as anchor point in the home for personalization of services and side loading content and advertising. The BMX home gateway has Wi-Fi and can synchronize content on a nomadic receiver when entering the client's home that is registered in BMX and has a binding with the home gateway 354. The BMX Home Gateway has an antenna and a NGB broadcast receiver and can receive broadcast and unicast services in heterogeneous network.

Finally, Interworking Interface 370 is an interface that allows the virtualized IP core to interwork with other BMX entities in other IP Core networks in other markets or regions of the country. Each receiver device contains a SIM card (or equivalent) that the user of the device registers with the home BMX, wherein the user personal data is stored in HSS. When a customer using a mobile device roams outside their home BMX market, the interworking, using data stored on the SIM of that mobile device, ensures continuity of service and enforcement of any geographic content right agreements from content producers, etc.

As discussed previously, the broadcast transmission network, which is the equivalent to the SFN 120 of FIG. 1, is comprised of transmitters and antennas 324C and defined modulator interfaces 322B and 324B. These components are located remotely from the virtualized IP core network, and use the control plane signal of the digital IP signal to create the signal that is eventually transmitted to users. In embodiments, the different modulator interfaces handle the different frequency bands, VHF and UHF. The modulator interfaces 322B and 324B receive the IP signals from NGB-GW 322A and 324A to create baseband digital signals, convert the signals to an analog RF waveform, and carry the analog RF waveforms as guided electromagnetic waves to transmitters and antennas 322C and 324C. The modulator interfaces 322B and 324B require significant hardware in the form of proprietary circuitry that can perform the functions of digital baseband processing: forward error correction (FEC) coding, fast Fourier transform (FFT), the creation of the bootstrap signal as defined in the ATSC 3.0 A/321 standard, the interleaving of data from the different PLPs of the different broadcasters and tenants on to OFDM resource blocks as described in the ATSC 3.0 A/322 standard, and so on. However, using 5G SDN/NFV technology, the digital baseband processing techniques can be performed in a central location similar to the virtualized IP core network functionalities.

Figure 4:
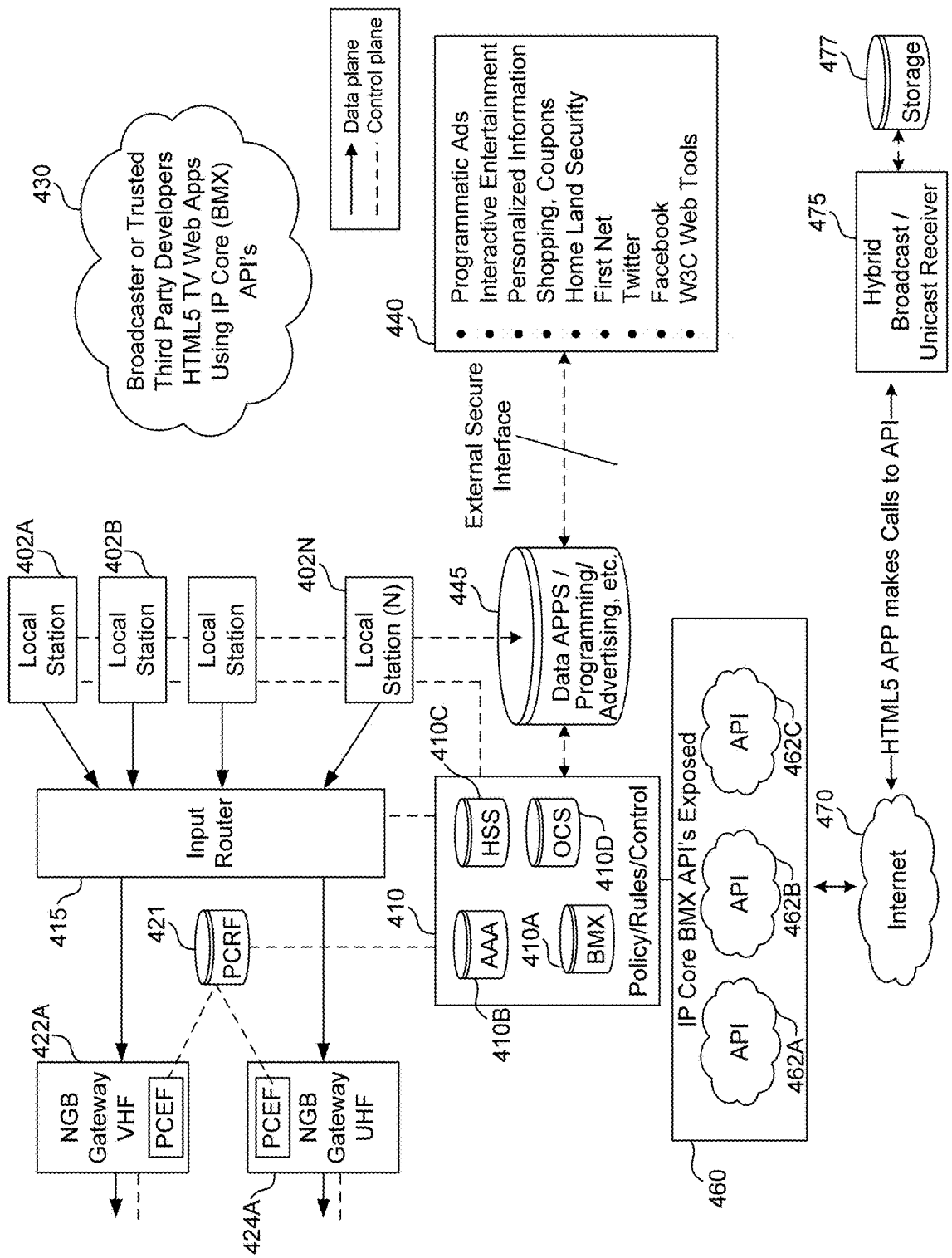
FIG. 4 illustrates use cases of an NGBP, according to an exemplary embodiment of the present disclosure.

FIG. 4 illustrates use cases of an NGBP, according to an exemplary embodiment. This represents a paradigm shift for terrestrial broadcasting over heterogeneous networks in the internet age and is described so that those skilled in the art may realize the utility of the IP Core network (BMX).

A main goal for broadcasting in the internet age is to fully embrace World Wide Web Consortium (W3C) web tools in a new NGBP ecosystem to create a compelling user experience that keeps pace with the internet at a reasonable cost. Broadcasters can then ride the rapid pace of technological innovation of the web. Hypertext Markup Language 5 (HTML5) treats video and audio as native elements (no plug-in) and offers rich new tools and a program environment including powerful HTML5 API's to enable web developers to create HTML5 Apps for the web. These tools and APIs can be found on W3C website or any number of books discussing HTML5 and will not be discussed in detail herein. Disclosed herein is an NGBP with IP Core network, a platform business model that can fully leverage some of these HTML5 tools and enable a broadcaster and or trusted third party HTML5 developers to develop HTML5 NGBP TV Apps. These HTML5 Apps can be developed and tested and also may leverage the new exposed API's by BMX from intelligence in the databases of BMX. Also data can be pushed and stored in the IP Core over a trusted secure interface to enable the Apps to then call BMX API's from the client for data, and also to receive BMX network services like completion of App transactions (sales), etc. using back office interface of IP Core network.

Software-Defined Networking and Network Function Virtualization

Software Defined Networking (SDN) allows network devices to be programmable and controllable from a centralized controller. Network Function Virtualization (NFV) is a network architecture concept that uses the technologies of IT virtualization and cloud computing techniques to virtualize entire classes of network node functions into building blocks that may connect, or chain together, to create communication services that run efficiently on commodity hardware (i.e., industry standard servers, storage and switches) and use open source software. NFV is a new way to define, create, and manage services on networks by replacing dedicated proprietary network hardware with software running on standard commercial off-the-shelf (COTS) hardware. The services could include functions typically handled by Radio Access Network (RAN) proprietary hardware that performs the modulation of data streams to create digital baseband signals. Therefore, in the NFV paradigm, modulation of data streams (such as the baseband IP streams that are output from the NGB-GW 322B and 324B of FIG. 3) can be performed such that a complete digital baseband signal is created at a central location which can then be converted into an analog RF waveform appropriate for over-the-air transmission. Software-defined networking (SDN) is focused on the IP packet switching infrastructure. SDN is highly complementary to NFV, and these are being combined synergistically.

SDN/NFV (Data Center) tools are being seriously considered today for future 5G wireless system architectures. However, the study and use of such tools has been primarily focused on "Unicast" network paradigms, and typically focused on small cell physics and frequency bands well above 1 GHz. For example, 5G system architectures are being designed to densify networks using several techniques, such as small cell technology and massive multiple-input multiple-output (MIMO) antennae schemes. These have the net effect of reducing inter-cell interference and increasing the capacity of a radio link by using multiple transmit and receive antennas to exploit multipath propagation. In addition, network densification also leverages the frequency domain (larger aggregated bandwidths, etc.) to increase capacity (bps) to a single user using unicast small cell physics constraints.

However, SDN/NFV tools have not been considered for modernizing broadcast system architecture. The NGBP uses SDN/NFV tools to provide a holistic "Broadcast" system architecture that will leverage the spatial domain (transmitter diversity or single frequency network—SFN) and frequency domain (larger bandwidths) and enhance and extend the concept of Broadcast Market Exchange (BMX). A market driven mechanism for spectrum use introduced in U.S. patent applications Ser. No. 14/092,993 and now as part of SDN/NFV architecture is optimized for broadcast.

Figure 5:
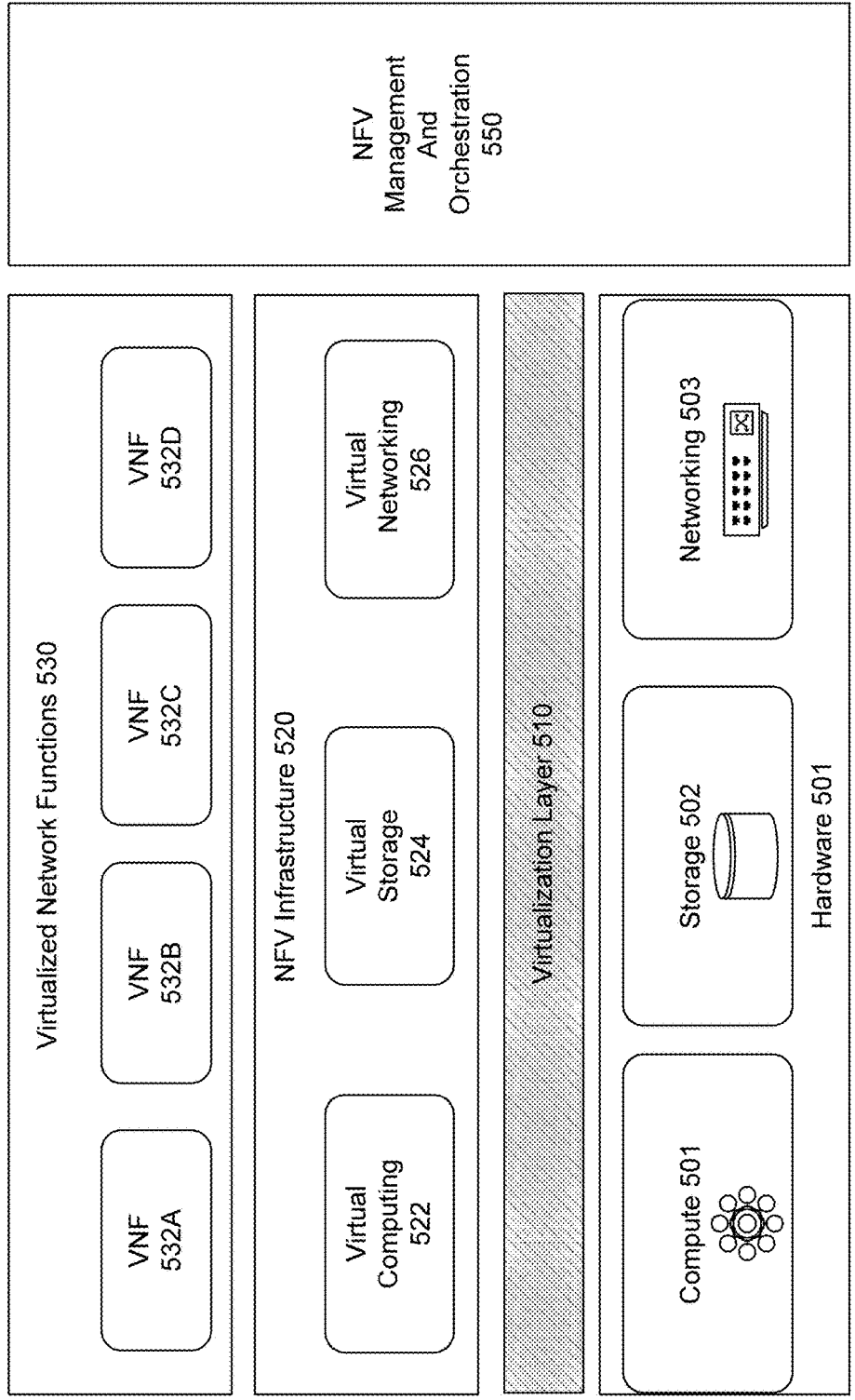
FIG. 5 illustrates an SDN/NFV system architecture, according to an exemplary embodiment of the present disclosure.

FIG. 5 illustrates an SDN/NFV system architecture, according to an exemplary embodiment. In particular, FIG. 5 illustrates a generic high level model of NFV and its five major functional areas, as shown in FIG. 5, the NFV architecture includes Management and Orchestration (MANO) 550, Virtualized Network Functions (VNFs) 530, NFV Infrastructure 520, Virtualization layer 510 and physical hardware, including compute resources 501, storage resources 502, and networking resources 503. In embodiments, the resources 501, 502 and 503 are made available via COTS hardware such as a simple interconnected server farm comprising multiple servers with common computing and storage resources and networking interfaces such as those embodied in FIG. 11.

In this high level model, MANO 550 is responsible for the management and orchestration of software resources and the virtualized hardware. The virtualization layer 510 abstracts the physical resources 501, 502, and 503 using virtual machines (VMs) and their hypervisors. The NFV infrastructure (NFVI) manages virtual computing resources 522, virtual storage resources 524, and virtual networking resources 526 that represent the amount of available resources from the physical resources 501-503. The NFVI provides a layer of abstraction such that the details of the underlying COTS hardware are hidden from the VNFs. The interaction between the virtualized resources and the physical resources is handled by the virtualization layer 510. The virtualization layer 510 may be any of a number of widely available operating system software packages designed to manage and control large pools of compute, storage, and network resources available in a data center. For example, OpenStack is a popular open-source cloud operating system that controls large pools of compute, storage, and networking resources in a datacenter, managed through a dashboard that gives wireless network operators controls to provision resources through a web interface and run automated.

Instances of the virtualized network functions (VNF) 532A-D can be executed in the virtualized resources 522-526 via VM technology, while the underlying hardware configurations are handled by the NFVI 520 and the Virtualization layer 510. VNFs 532A-D may perform all manner of network function that may have only been previously using proprietary hardware. For example, a VNF for error correction coding may be available which adds redundancy to a bit stream in accordance with a number of different coding schemes and rates. Another VNF may add the required bootstrap signal preamble as defined in ATSC 3.0 A/321. Still another VNF may perform the FFT operation on a bit stream to create the digital baseband signal that can then be converted to an analog waveform for transmission through a remote radio head. Although only 4 VNFs are shown in the Virtualized Network Functions 530, this is not meant to be limiting but in reality would be part of a NFV catalog or library of functions that would evolve. Similarly, Open Daylight (ODL) is a modular Open Source SDN platform for IP networks of any size and scales from the WAN into the cloud (datacenter) synergistically routing IP packet flows. ODL and OpenStack could be used in conjunction to provide a fully virtualized infrastructure for the IP Core and digital baseband signal processing.

NGBP with 5G

Figure 6:
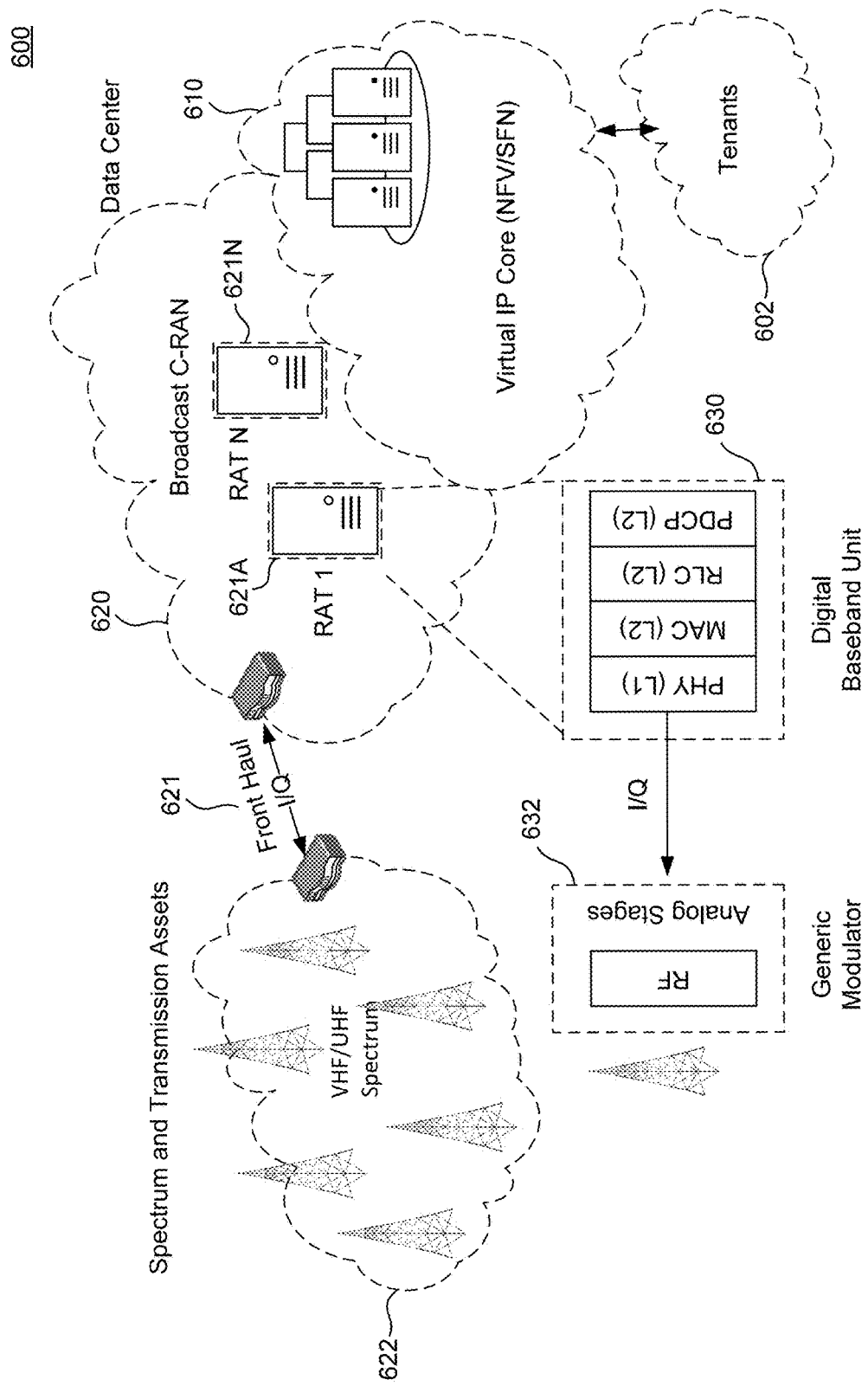
FIG. 6 illustrates an NGBP implemented with SDN/NFV, according to an exemplary embodiment of the present disclosure.

FIG. 6 illustrates an NGBP implemented with SDN/NFV, according to an exemplary embodiment of the present disclosure. FIG. 6 in particular depicts an exemplary embodiment of the NGBP implemented with 5G SDN/NFV technology. In embodiments, some or all of the components of FIG. 6 have non-5G analogs in the system depicted in FIG. 1. Therefore, FIG. 6 is similar to the NGBP of FIG. 1 and FIG. 3, but with even more of the functionality shifted to a centralized data center that performs the functions of the IP Core and Broadcast Centralized Radio Access Network (BC-RAN) due to the use of 5G technologies. As with the original NGBP, the purpose of the system depicted in FIG. 6 is to allow tenants (both licensed broadcasters and outside tenants) to utilize a shared spectrum pool comprising the aggregated spectrum of licensed frequency bands and shared infrastructure based on market mechanisms in which tenants would essentially "rent" spectrum resources to serve their customers. This is representative of a community cloud model and offers a new service paradigm for the broadcasters that is broadly referred to as "Broadcast-as-a-Service" (BaaS). The major domains of the new broadcast system architecture are described below. Comparisons to the system embodiments of FIG. 1 and FIG. 3 are made when appropriate.

The tenants 602 are an embodiment of the broadcast tenants 101 of FIG. 1 or the local stations 302A-N of FIG. 3. As with the embodiments of FIGS. 1 and 3, tenants 602 produce content data streams which are fed into the Virtualized IP Core 610, which contains entities using SDN and NFV library functions. In embodiments, virtualized IP core 610 is a virtualized implementation of the IP core network 110 depicted in FIG. 1 using SDN/NFV, and may perform all of the same functions of the IP core network 110. As discussed relative to FIG. 3, the main components of the IP core network 110 are the policy entity 310 including the BMX entity 310A, IP input router 315, and NGB-GWs 322A and 324A. The Virtualized IP core 610 may perform all of these same functions and more, but using an SDN/NFV implementation on COTS hardware with the increased flexibility of being instantiated in software. As with the embodiments of FIGS. 1 and 3, the BMX entity contained in virtualized IP core 610 continues to govern the spectrum pool allocation of the different tenants based on the SLAs of the tenants which are stored within the BMX, and the functions discussed relative to FIGS. 1 and 3 are mirrored in the embodiments of FIG. 6. Now, however, IP core 610 is integrated with BC-RAN 620 in a data center (e.g., using cloud computing), and digital modulation occurs within the BC-RAN 620 rather than remotely in defined modulator interfaces such as 322B and 324B of FIG. 3.

The BC-RAN 620 has multiple radio access technology (multi-RAT) capabilities in software 621A-N, and performs the physical layer digital baseband processing. The digital baseband processing functions are performed using VNFs instantiated in a data center using NFVI similar to NFVI 510 of FIG. 5. The data center implementing the BC-RAN 620 may be collocated (centralized) in the data center implementing the virtualized IP core 610. In other embodiments, the data center performing the BC-RAN 620 may be a distinct data center from that of the virtualized IP core 610. The IP stream received from the IP core is processed using various digital signal processing VNFs as dictated by the BMX and a digital baseband "I/Q" signal 621 is generated.

The digital baseband I/Q signal 621 is delivered to the analog modulator 632 that is collocated with transmitters 622. The modulator 632 is a generic modulator or hybrid that accepts digital I/Q signals. The modulator 632 may perform two functions: converting the digital baseband I/Q signal 621 to an analog baseband signal using digital-to-analog converters (DACs), and upsampling the analog baseband signal to the appropriate frequency band using a carrier frequency modulator. The resulting analog waveform (e.g., an analog passband signal) is the final signal to be transmitted by the transmitters 622. Thus, a digital baseband signal resulting from digital signal processing is generated in a data center implementing the BC-RAN 620 and sent to the generic analog modulator 632 for processing, where the analog modulator is completely agnostic to the digital signal that has been received from the BC-RAN and this capability is very flexible. This means that different I/Q signals (waveforms) can be instantiated in data centers (software NFV) and processed by remote radio heads (RRHs), which may be generic modulators, in a transmission network without any impact or change required in transmitter network to produce different waveforms, which is a major advantage of BC-RAN. The transmitters 622 contain remote radio heads (generic modulators) for transmitting over the air signals to the customers of the broadcaster or tenant NGBP users.

As was discussed relative to FIG. 1, the SFN 120 comprised both digital signal processing and analog modulation functions which modulated a baseband IP signal 112 arriving from the IP core network 110 and transmitted the final analog waveform to customers. This approach had limitations due to the digital baseband processing being performed in dedicated hardware—dedicated hardware is essentially hard-coded to perform the set of functions associated with only one radio access technology (e.g. OFDM for LTE). In the current embodiment of FIG. 6, the digital baseband processing is performed in the BC-RAN 620 separate from the analog modulator 632 and the transmitters 622. The digital baseband processing functions are performed through NFV running on COTS hardware in a data center, as opposed to dedicated proprietary hardware. Therefore, as is shown in FIG. 6, the output of the BC-RAN is a digital baseband signal (the digital I/Q signal 621) that results from digital signal processing of IP streams coming from the virtualized IP core 610. The NFVs of BC-RAN 620 also perform some or all digital signal processing functions specific to NGBP, such as adding the bootstrap signal to the digital baseband signal 621 as described in ATSC 3.0 A/321.

Figure 7:
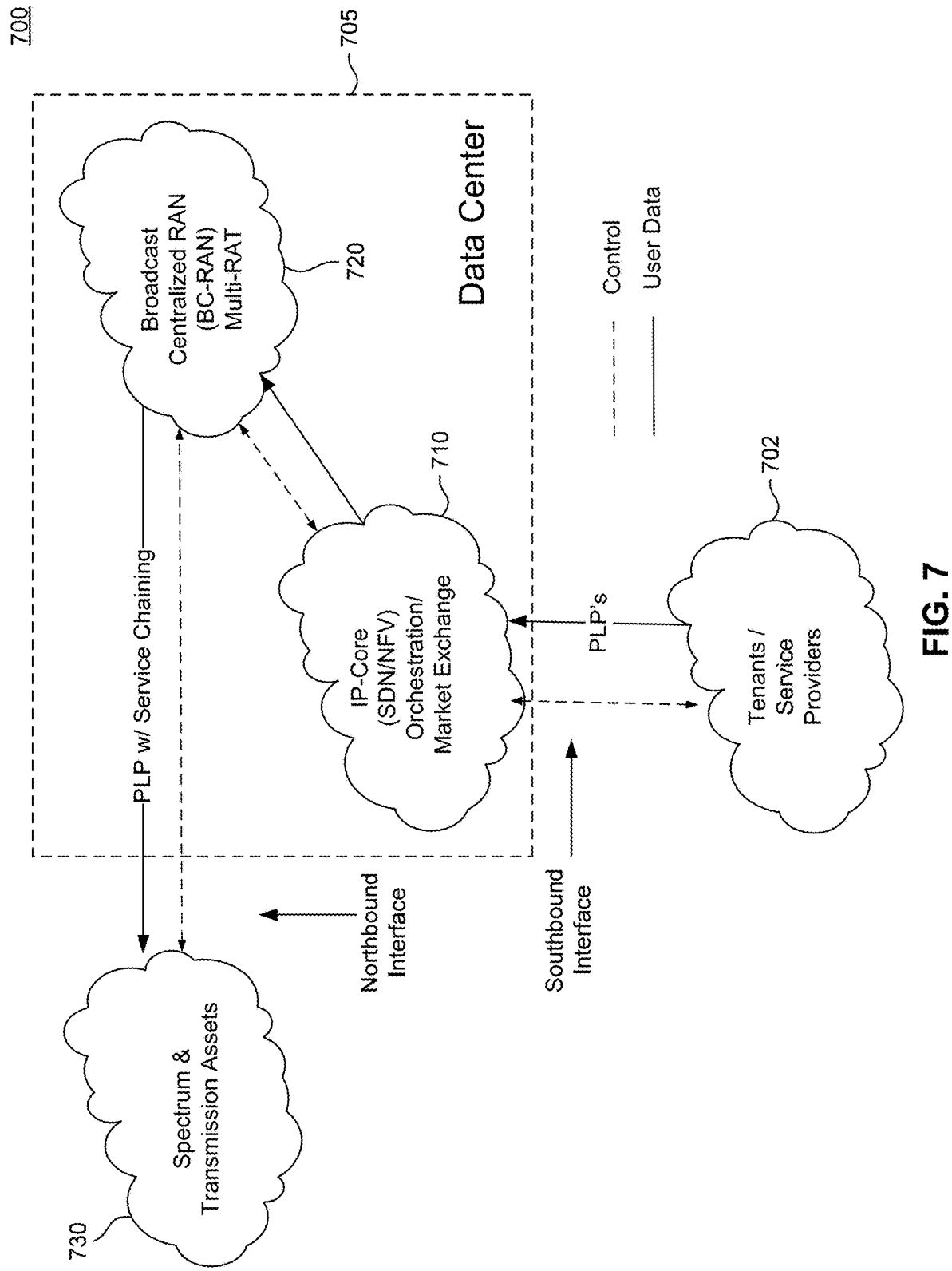
FIG. 7 illustrates data flow in an SDN/NFV NGBP, according to an exemplary embodiment of the present disclosure.

Furthermore, because digital signal processing is now performed in software running atop COTS hardware instead of dedicated network devices, the digital signal processing is not limited to just a single radio access technology (RAT) or waveform, and can in fact create digital baseband signals compatible with multiple RATs (multi-RAT). In the embodiments of FIG. 1, the digital signal processing is limited specifically to OFDM frames because it is implemented in proprietary hardware designed specifically for OFDM modulation. The enhancement of 5G NFV technologies in the present embodiment allows for more than OFDM modulation, and can be used to create digital baseband signals in accordance with ATSC 3.0, LTE, UMTS, WiMAX, or other widely deployed RAT technologies. Simultaneously, due to the separation of digital signal processing from the analog functions, the transmitters 622 and the analog modulator 632 are agnostic to the type of digital baseband signal received from the BC-RAN, allowing for maximum flexibility and new use cases. FIG. 7 illustrates data flow in an SDN/NFV NGBP, according to an exemplary embodiment. FIG. 7 depicts a system 700 of the 5G NGBP architecture depicted in FIG. 6 with an emphasized view of the IP streams. In the figure, the virtualized IP core 710 and the BC-RAN 720 are both implemented using SDN/NFV technology in a single data center 705 using cloud computing. The tenants 702 are once again broadcast service providers (licensees) that send IP flows (data) and a virtual construct of multimedia services termed a physical layer pipe (PLP) to the virtualized IP core 710. As can be seen, both control plane signal and user plane signals feed into the IP core 710 from a southbound interface, where the control plane signaling (SDN) is generated by the BMX implemented in the IP-CORE as well as the Management and Orchestration (MANO) module that manages the virtualized infrastructure and the COTS hardware of the data center. After the PLP is processed by VNFs in the IP core 710, the signal is sent to the BC-RAN 720, where digital signal processing is applied to create a waveform. The resulting signal, labeled "PLP w/service chaining," is sent over the northbound interface to the spectrum and transmission infrastructure assets 730. In an embodiment, the spectrum and transmission infrastructure assets 730 contains transmitters and the analog modulator, such as transmitters 622 and analog modulator 632 depicted in FIG. 6.

Because the IP core and BC-RAN functions that modify or modulate a data flow for a particular tenant are now implemented virtually using 5G SDN/NFV in a single data center rather than in proprietary hardware, the functions from both IP core and BC-RAN are concatenated to form a "PLP Service Chain." The term PLP service chain is synonymous to the term network slicing in 3GPP 5G. The PLP service chain can be thought of as a collection of logical VNFs that support the service requirements of a particular tenant. Some PLP service chains will be very rich in functionality, while others very simple. PLP service chaining via SDN/NFV spans both the virtual IP Core and the virtualized physical layer digital signal processing. The flexibility of PLP service chaining can be a key enabler to creating new business models. A given PLP service chain will simply contain the functions required for a given application under programmable control.

Each PLP entering the IP Core (southbound interface) has specific VNF functions such as AAA, SLA, and Policy and is associated to one or more service types such as Fixed, Mobile, IoT, and/or Hyperlocal. The PLPs with Service Chaining then enter BC-RAN and the PLP VNFs are processed in BC-RAN to create a digital baseband signal, where the processing includes such functions as FEC coding, FFT modulation, and interleaving commensurate to the service being offered to customers by the tenant. Finally, a processed PLP with service chaining is sent via the northbound interface towards spectrum and transmission assets.

Therefore, the PLP service chain is composed of a collection of network functions and specific physical layer digital processing functions (Modulation, FEC Coding, Inter-leaving) that are combined or concatenated together for the specific use case or business model. The final signal transmitted from the data center to the spectrum and transmission infrastructure assets 730 over the northbound interface is a digital baseband signal (such as signal 621 seen in FIG. 6) that will be passed to the analog generic modulator(s) contained within the spectrum and transmission infrastructure assets 730.

The BMX orchestration entity contained within the IP core manages pooled VHF/UHF spectrum as a commodity in a market driven manner. Depending on the SLA of a particular PLP, a frequency band with the proper physical properties to meet the requirements of that SLA is selected by the BMX for that particular PLP. The BMX also handles a number of other functions:

Spectrum Management Function: the BMX manages the shared spectrum pool, releases spectrum resources to the pool, and assigns spectrum resources to incoming media content and data service requests to available broadcasting resources. This resource mapping is achieved by coordination with real-time resource schedulers located in the regional clouds mapping the physical layer resources to frames. SLA requirements have to be met in serving a service request.

Demographics or geography or analytics based constraint, e.g. certain content becomes higher priority in certain geographies, etc.

Identity and Authentication management: the BMX manages role-based secure access for content providers, broadcast partners, etc.

SLA Management: the BMX manages the agreements between various tenants—content providers, broadcast partners, broadcast network operator (neutral host), mobile network operators, etc. The competition between the different SLAs dictates the spectrum allocation for each PLP of each tenant, which may pick priority of assignment when availability of the shared spectrum pool is low depending on quality of service of SLA, etc.

Policy Framework: the BMX provides support for policies tied to SLAs that facilitate differentiated QoS for different IP data streams under different scenarios, etc.

Charging management: the BMX manages charging related functions and facilitates business relationships between the broadcast licensees who own the underlying spectrum, and between those broadcast licensees and any outside tenants that may wish to rent a portion of the spectrum dynamically for a period of time.

Analytics and Key Performance Indicators (KPIs): the BMX handles and in some cases generates analytics and KPIs to track performance, optimizes deployments, identify areas for new deployments, assist in SLA enforcement, feed into Machine-learning based Business Intelligence solutions (future), etc.

Monitoring functions: the BMX tracks operational metrics to identify/manage/predict impact to network operations, cloud services, and other aspects of the broadcasting network.

System services: This includes logging/GUI/Dashboards/Configuration management. Since the system supports different partners pooling their channel resources, there is also need for tools and dashboards that partners can use for more visibility into how their spectrum resources are being consumed, related analytics, related charging information etc. to support their business model/s executing using BaaS.

Figure 8:
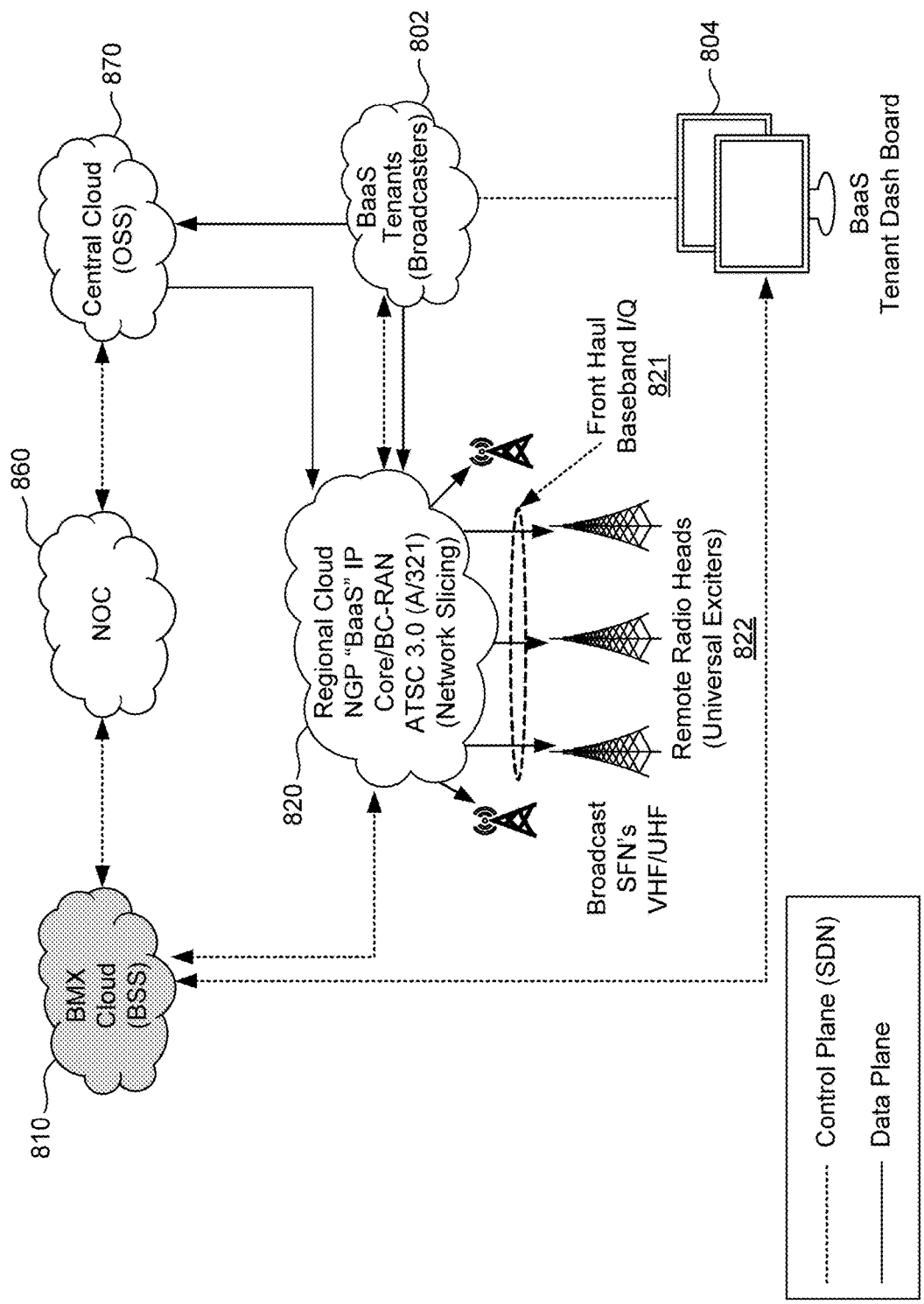
FIG. 8 illustrates another implementation of an SDN/NFV NGBP, according to an exemplary embodiment of the present disclosure.

FIG. 8 illustrates another implementation of an SDN/NFV NGBP, according to an exemplary embodiment which is based on a community cloud model. FIG. 8 displays a high-level alternative embodiment to a nationwide architecture of NGBP architecture. Each BaaS tenants 802 pooling resources under BMX 810 in a market/region of the country (only one region shown in FIG. 8) uses the services of a regional cloud data center 820 which implements the IP core and BC-RAN functions. In this embodiment, the BMX 810 using SDN controllers may be located remotely from the IP core of the regional cloud data center 820 in a nationwide deployment, but still maintains control of business/spectrum management and could be instantiated in an Amazon Web Services (AWS) cloud service or an equivalent. The BaaS tenant dashboard 804 provides the BaaS tenants 802 with an interface, for example a GUI hosted by the BMX 810, to allow the tenants to reserve spectrum resources and enter into SLAs for their services and monitor the economics (charging) of their business model/s running on NGBP. In FIG. 8, the IP core and the BC-RAN RAN are shown to be explicitly collocated within the same data center 820, where, as discussed previously, the functions of both the IP core and the BC-RAN are run in software over virtualized hardware resources.

In FIG. 8, the dotted lines indicate control plane (SDN) signaling and the solid lines indicate the IP data plane. For perspective, the BaaS licensed broadcast tenants in a local market are located inside the cloud 802 (only one market/region of country is shown in FIG. 8). These local broadcast partners or tenants of the community cloud send IP data flows (under BMX control) into a regional cloud data center 820 (SDN/NFV) shown. Within the data center 820, the IP data flows are first processed by VNFs in the IP core and then by VNFs in the BC-RAN to construct specific digital waveforms. In particular, the control plane data from the BMX 810 to the regional cloud data center 820 may dictate the VNFs that are applied to the IP data flows for each of the tenants. This linking of NFV functions is termed "Network Slicing" in 3GPP 5G and the term is adopted here in NGBP as will be discussed. The digital I/Q digital baseband signal is then transported to the broadcast generic modulator or RRH at the transmitter sites 822 in a SFN on a given channel (2-36) using concepts of broadcast C-RAN.

The regional cloud data center 820 and the BMX 810 maintain a feedback loop such that the regional cloud can continuously inform the BMX 810 about the status of the shared spectrum pool. In this way, the BMX 810 in coordination with 820 can in real-time manage the spectrum pool resources that are available for allocation to BaaS tenants 802.

Figure 9A:
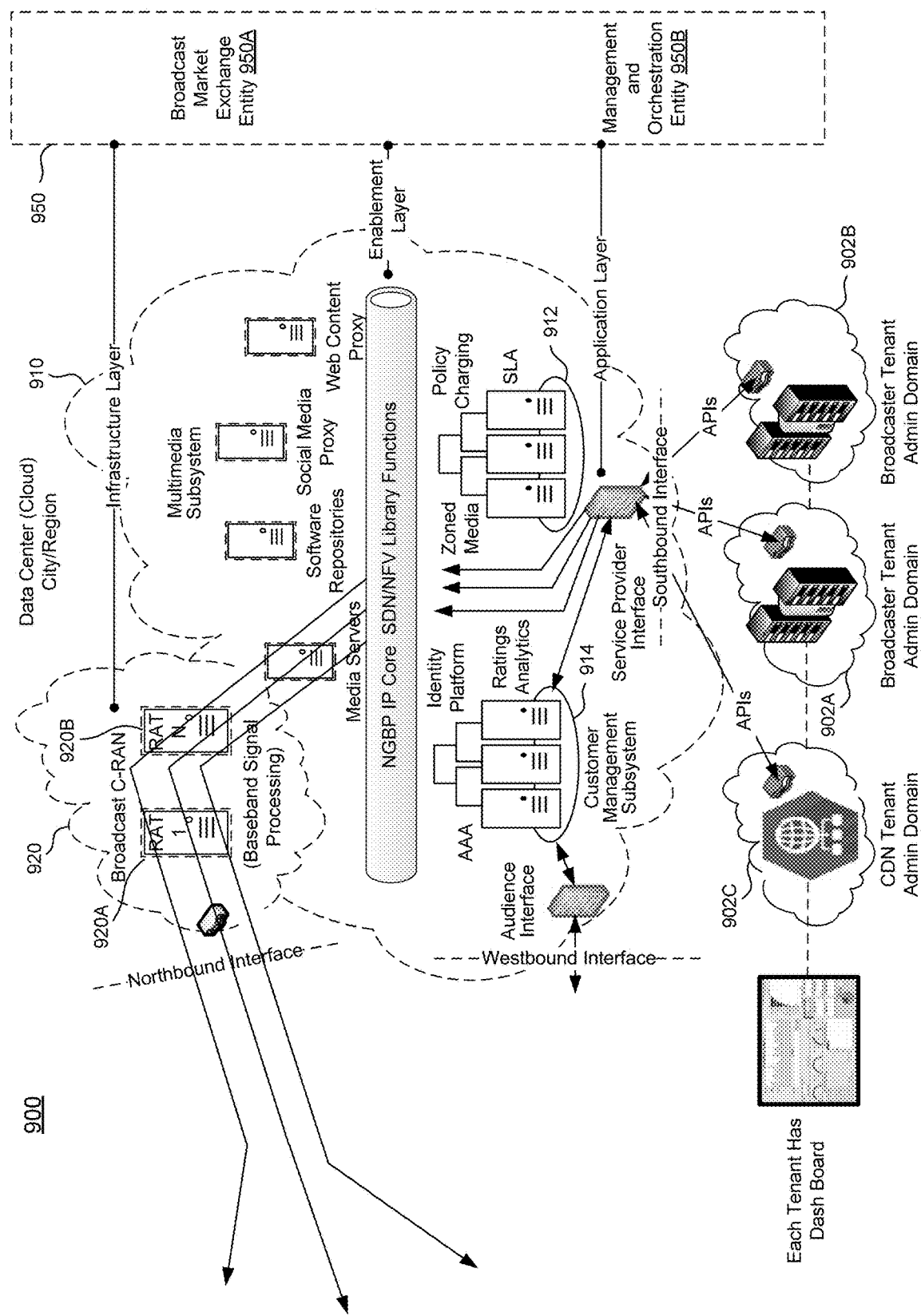
FIGS. 9A-9C illustrate functional blocks of the NGBP implemented with SDN/NFV, according to an exemplary embodiment of the present disclosure.
Figure 9B:
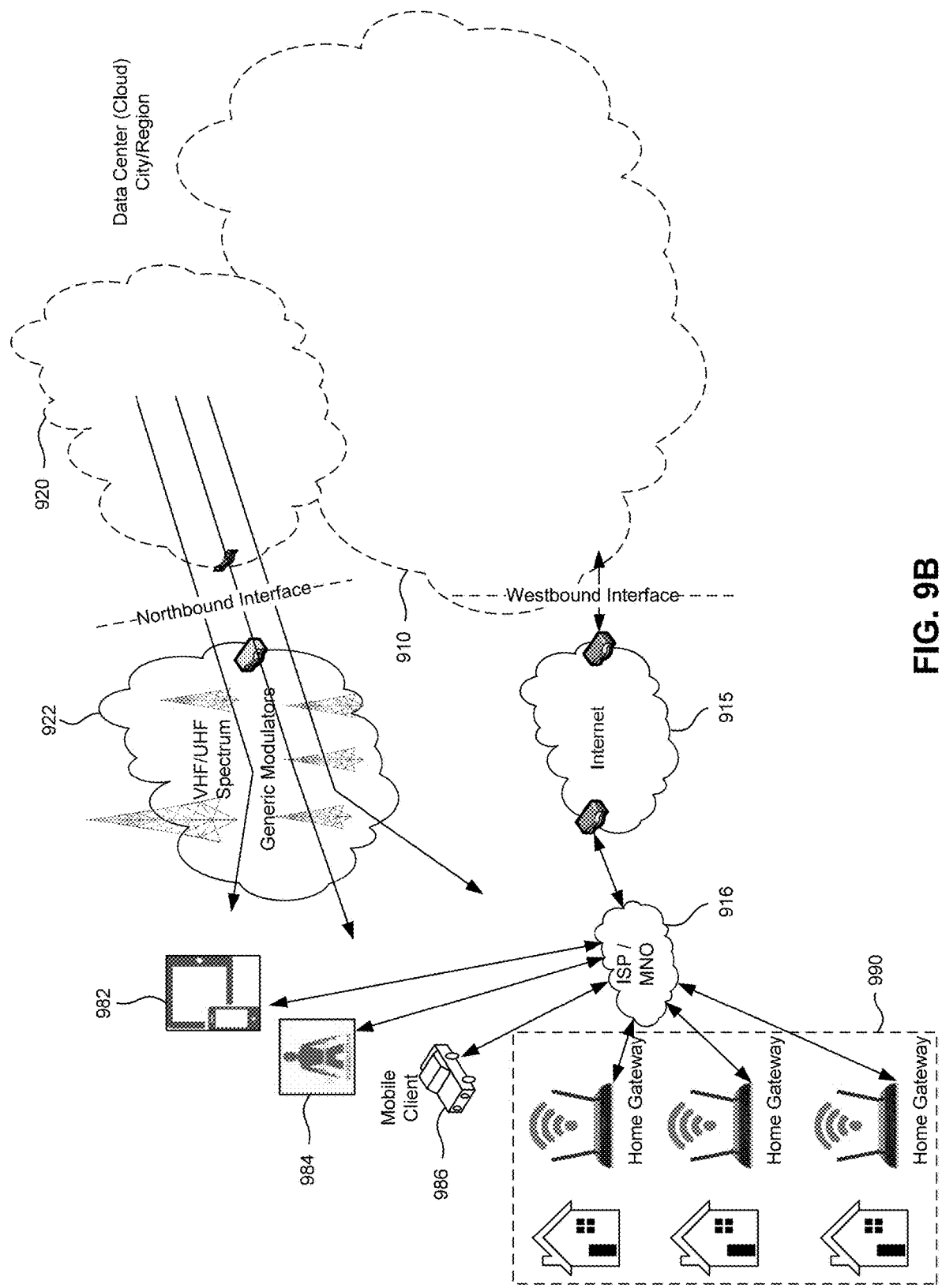
Figure 9C:
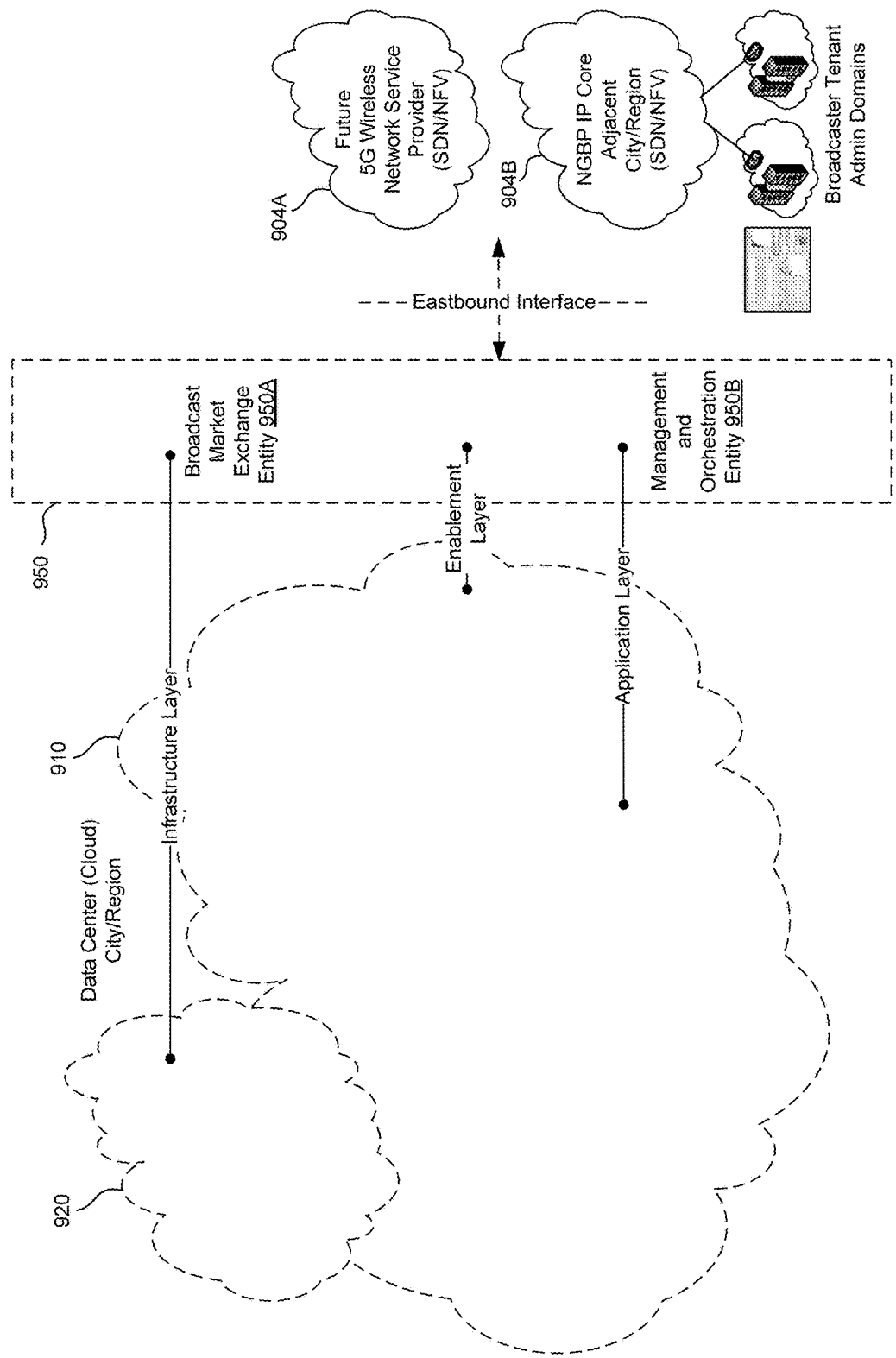

FIGS. 9A-C illustrate functional blocks of the NGBP implemented with SDN/NFV, according to an exemplary embodiment. The embodiment of FIGS. 9A-C can be considered an embodiment of the systems depicted in FIGS. 6 and 8. In FIG. 9A, a single data center 900 is depicted which hosts both the IP core 910 and the BC-RAN 920, along with the library of NFV Functions that can be used in PLP service chaining or network slicing. This data center may be an embodiment of the data center 820 of FIG. 8 or the combined IP 710 core and BC-RAN 720 of FIG. 7. As discussed relative to FIG. 5, the data center is constituted from standard IT hardware (servers, storage, networking), and the data center uses a virtualization layer implemented in software (such as layer 510 in FIG. 5) to virtualize the resources provided by the standard IT hardware into general resource pools for compute, storage, and networking. These virtualized resource pools are used by the IP core 910 and BC-RAN 920 to instantiate VNFs to modulate IP data flows received by tenants 902A-C without coordinating and configuring the specific hardware being used. These VNFs can then be applied to the IP. The data center has NFV functions for Customer Service, Service Providers, Multimedia Subsystems and BC-RAN (waveforms). The Management and Orchestration (MANO) module and the Broadcast Market Exchange 950 may be collocated with the data center or in remotely located data center. A person with ordinary skill in the art will recognize that these different entities can be located on different physical data centers, as is common in cloud computing, without affecting the underlying principles of the system.

The southbound interface and exposed APIs allow tenants 902A-C to send their PLPs (IP data flows) into the IP core 910. In FIG. 9A, those PLPs are represented by the arrows flowing into the IP core 910 from the tenants 902A-C. In embodiments, the tenant entity may include local broadcasters, service providers, content delivery networks (CDNs), advertisers and third parties including government entities, etc. After an IP Flow PLP has been processed by VNFs from the IP core 910, the now modified PLP is sent from the IP core 910 to the BC-RAN 920, as indicated by the arrows. Within the BC-RAN, the modified IP data flows are then passed through VNFs that perform the appropriate digital signal processing, and a digital baseband I/Q signal is generated.

The southbound interface also provides the tenants with an interface API or control plane signaling to send IP flows into the IP core—specifically, tenants 902A-C receive control plane information via a protocol with the BMX entity 950A such that the BMX entity can in turn determine which VNFs will be operative for each PLP based on an SLA with the tenant associated with that IP flow. This control plane data may be sent as direct signaling to the BMX, where tenants may access a dashboard to enter their requested service requirements, such as the BaaS Tenant Dashboards 804 of FIG. 8. The dashboards allow tenants to provision and or monitor the tenant's services that are currently instantiated in the data center, as well as the pooled spectrum assets currently being allocated to the tenant using (BaaS) for independent business models flexibly using this broadcast cloud model.

Within the BC-RAN, VNF groups 920A and 920B exist for different RATs that can modulate the IP data flows from tenants to be transmitted across different RATs or waveforms specific to a service. As discussed above, this flexibility is allowed by the centralized virtualized nature of the digital signal processing—rather than proprietary hardware that is only designed to perform specific digital signal processing such as OFDM, the VNF functions that modulate the PLP are now implemented in software, such that any RAT can be supported so long as VNFs that support the digital signal processing in accordance with that RAT exist within the software function libraries of BC-RAN 920. Although only two RATs 920A-B are shown, a person with skill in the art will recognize that VNFs supporting any number of RATs or waveforms may be supported in the BC-RAN using cloud computing. The northbound interface provides the digital baseband I/Q signal transport to the transmission and spectrum assets being managed.

FIG. 9B depicts the northbound and westbound interfaces of the NGBP. The northbound interface passes digital baseband signal from BC-RAN 920 to the spectrum assets 922, which may include generic analog modulators to perform the DAC conversion of the digital baseband signal and shift the resulting analog signal to the appropriate carrier frequency, (remote radio heads) which transmit the waveform over-the-air to customers. The customers may be home customers 990, which will primarily receive broadcast television signals for HDTV signals, and devices 982-986, which may receive television signals as well as other content. In embodiments, the devices 982-986 include all manner of nomadic devices, such as mobile devices, high-mobility devices like connected car devices, or periphery and IoT devices like smart watches and fitness monitors. Meanwhile, the westbound interface delivers unicast content from CDN 902C to customers directly through the internet 915 and ISP/WISP/MNO networks 916. Unlike the northbound interface, in embodiments the westbound interface may also provide an uplink connection for customers to send data into the IP core 910 over an audience interface to a customer management sub-system 914 to enable business models by providing critical data on customers and usage patterns into databases of consumer management sub-system 914.

FIG. 9C depicts the eastbound interface of the 5G NGBP for interworking with other NGBP networks in a nationwide deployment including adjacent cities/regions broadcasters 904B as tenants in a similar data center coordinating business models for consumer facing services with roaming. This interface can also be used for interworking by non-broadcast IP networks such as future 5G, etc. to enable convergence with future 5G network operators 904A.

In the future the possibility will exist for interworking between cooperating operators of next generation broadcast system architecture and 3GPP 5G unicast networks. This IP interworking over eastbound interface can be based on real-time traffic analytics and execution of service level agreements (SLA) between operators using their software programmable infrastructures driven by market economics (e.g., business deals).

In view of the system depicted in FIGS. 9A-C, the concept of PLP service chaining is now discussed in further detail. As was discussed previously, the network function virtualization infrastructure (NFVI), as depicted in FIG. 5, applies network functions implemented in software to IP flows PLPs from broadcasters and content providers. In FIG. 9A, the IP core 910 contains software libraries containing VNFs that can be instantiated to perform core services such as Authentication/Authorization/Accounting (AAA), Identity, Ratings, Policy Charging, SLA, etc. as required by a service under SLA.

After the IP core applies various VNFs to the PLP received from the tenant based on SLA and service, the resulting modified PLP is sent to the BC-RAN 920, where different signal processing functions are instantiated to create digital baseband signals that can easily be converted to analog RF waveforms suitable for over-the-air transmission. In particular, the VNFs of the BC-RAN 920 are capable of processing the incoming data signals in accordance with different RATs or waveforms specific to a service type such as IoT, Mobile, Fixed, etc. This flexibility is made possible specifically because the processing is performed by VNFs implemented in software and instantiated on common IT hardware, instead of in proprietary hardware implementations that are typically designed for only one wireless standard. The VNFs of both the IP core 910 and BC-RAN 920 are instantiated on Virtual Machines (VMs) deployed on the COTS hardware within a data center instead of individual dedicated equipment. These functions are programmable and are called from library under orchestration to assemble PLP service chains and physical broadcast waveforms. Again, this process of service chaining NFV functions to create services is termed network slicing in 3GPP 5G and both are equivalent in concept.

In FIG. 9A, for example, four PLP's are shown entering datacenter from tenant domain over the southbound interface. The BMX entity 950A, via an application layer that interfaces with the southbound interface, receives the requests of each of the tenants for services on the NGBP. It then orchestrates, via the Management and Orchestration (MANO) module 950B that manages the resources of the NFVI, the processing of each PLP through VNFs served in the IP Core based on the needs of the service served by the PLP. For example, a service targeted at IoT devices would require different IP core services than an interactive multimedia service. The MANO, through an enablement layer that interfaces with the IP Core 910, ensures that the correct VNFs are used to constitute each PLP service chain. The MANO, via an infrastructure layer that interfaces with the BC-RAN 920, instructs the BC-RAN to process each PLP service chain with the appropriate digital processing functions (Modulation/FEC Coding, etc.), thus concatenating or chaining digital signal processing VNFs with the IP core VNFs. The PLP may be assigned to either VHF or UHF spectrum assets based on their service requirements. As seen in FIG. 9B, the PLP service chains are shown exiting via northbound interface as digital I/Q to the transmitters assigned in system architecture.

Figure 10:
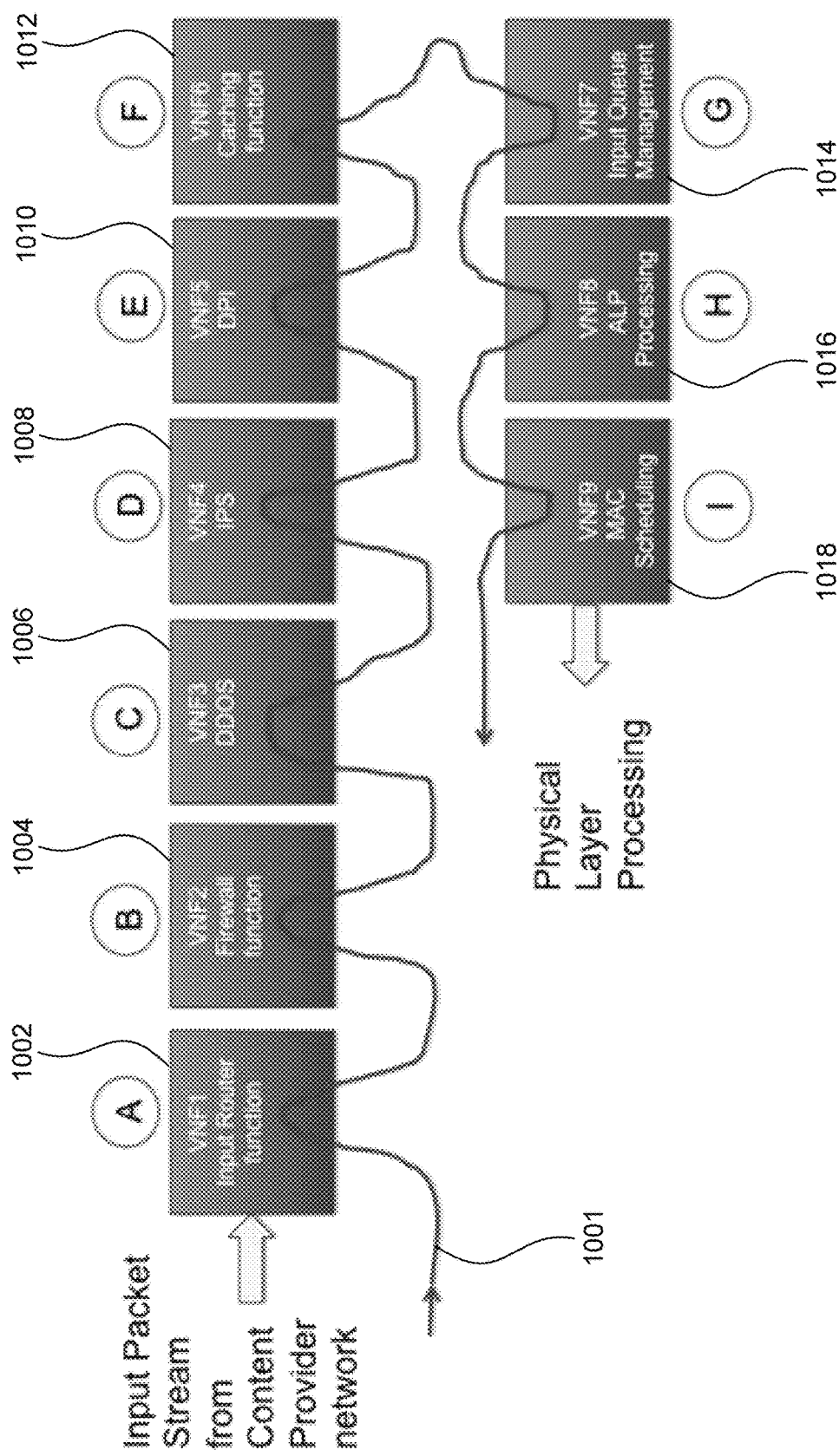
FIG. 10 illustrates physical layer pipe (PLP) service chaining used in NGBP implemented with SDN/NFV, according to an exemplary embodiment of the present disclosure.

FIG. 10 illustrates concept of PLP service chaining used in NGBP implemented with SDN/NFV, according to an exemplary embodiment. PLP service chaining may be performed by the NGBP, such as the one depicted in FIG. 9A. In FIG. 10, IP core VNFs 1002-1014 are applied to a PLP 1001 and concatenated with the BC-RAN VNF's 1016-1018 and others not explicitly shown for the physical layer digital waveform instantiation based on instructions from the BMX. The "chaining" of functions shows the concept of Network Slicing for ATSC 3.0 which could be targeted at specific use cases of the NGBP tenant business models. This chaining of NFV functions represents the software provisioning on a service by service basis. In the NFV world, new services can be instantiated as software-only, running on commodity hardware—because the functions are performed in software using virtual circuits, these connections can be set up and torn down as needed as done by web-scale IT players today using cloud computing and with service chain provisioning through NFV orchestration layer such as OpenStack, etc.

Computer System

Figure 11:
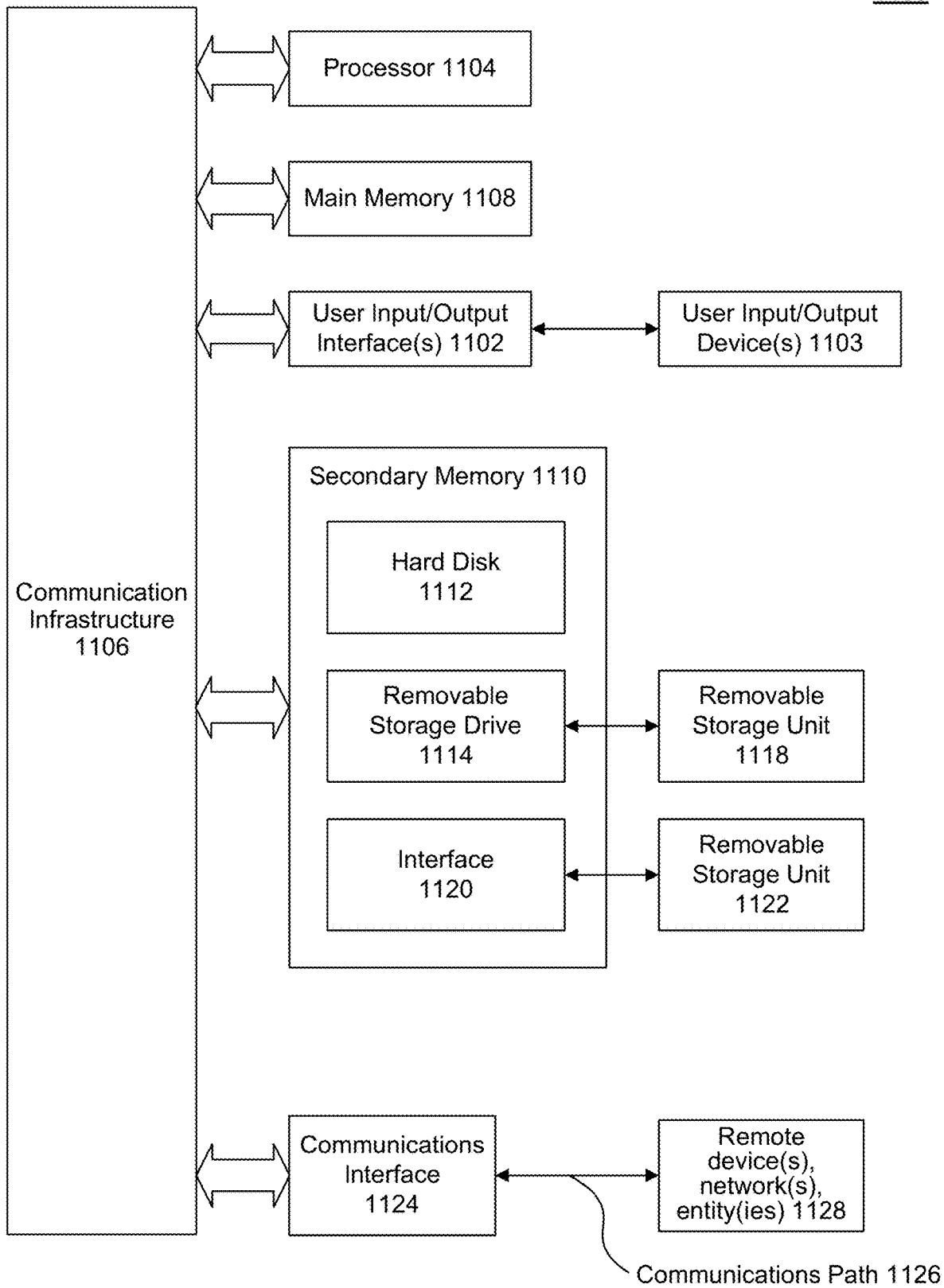
FIG. 11 illustrates a computer system, according to an exemplary embodiment of the present disclosure.

FIG. 11 illustrates a computer system 1100, according to an exemplary embodiment. Computer system 1100 may be used to implement the methods and apparatus of the present disclosure. System 1100 may be an embodiment of a single COTS server that, in conjunction with many other servers with similar functionality, forms the underlying hardware of the data center that enables the IP core network and BC-RAN network of the present disclosure. Computer system 1100 includes one or more processors, such as processor 1104. Processor 1104 can be a special purpose or a general purpose digital signal processor. Processor 1104 is connected to a communication infrastructure 1106 (for example, a bus or network). Various software implementations are described in terms of this exemplary computer system. After reading this description, it will become apparent to a person skilled in the relevant art(s) how to implement the disclosure using other computer systems and/or computer architectures.

Computer system 1100 also includes a main memory 1108, preferably random access memory (RAM), and may also include a secondary memory 1110. Secondary memory 1110 may include, for example, a hard disk drive 1112 and/or a removable storage drive 1114, representing a floppy disk drive, a magnetic tape drive, an optical disk drive, or the like. Removable storage drive 1114 reads from and/or writes to a removable storage unit 1118 in a well-known manner. Removable storage unit 1118 represents a floppy disk, magnetic tape, optical disk, or the like, which is read by and written to by removable storage drive 1114. As will be appreciated by persons skilled in the relevant art(s), removable storage unit 1118 includes a computer usable storage medium having stored therein computer software and/or data.

In alternative implementations, secondary memory 1110 may include other similar means for allowing computer programs or other instructions to be loaded into computer system 1100. Such means may include, for example, a removable storage unit 1122 and an interface 1120. Examples of such means may include a program cartridge and cartridge interface (such as that found in video game devices), a removable memory chip (such as an EPROM, or PROM) and associated socket, a thumb drive and USB port, and other removable storage units 1122 and interfaces 1120 which allow software and data to be transferred from removable storage unit 1122 to computer system 1100.

Computer system 1100 may also include a communications interface 1124. Communications interface 1124 allows software and data to be transferred between computer system 1100 and external devices. Examples of communications interface 1124 may include a modem, a network interface (such as an Ethernet card), a communications port, a PCMCIA slot and card, etc. Software and data transferred via communications interface 1124 are in the form of signals which may be electronic, electromagnetic, optical, or other signals capable of being received by communications interface 1124. These signals are provided to communications interface 1124 via a communications path 1126. Communications path 1126 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 1118 and 1122 or a hard disk installed in hard disk drive 1110. These computer program products are means for providing software to computer system 1100.

Computer programs (also called computer control logic) are stored in main memory 1108 and/or secondary memory 1108. Computer programs may also be received via communications interface 1120. Such computer programs, when executed, enable the computer system 1100 to implement the present disclosure as discussed herein. In particular, the computer programs, when executed, enable processor 1104 to implement the processes of the present disclosure, such as any of the methods described herein. Accordingly, such computer programs represent controllers of the computer system 1100. Where the disclosure is implemented using software, the software may be stored in a computer program product and loaded into computer system 1100 using removable storage drive 1114, interface 1120, or communications infrastructure 1106.

In another embodiment, features of the disclosure are implemented primarily in hardware using, for example, hardware components, such as application-specific integrated circuits (ASICs) and gate arrays. Implementation of a hardware state machine so as to perform the functions described herein will also be apparent to persons skilled in the relevant art(s).

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A terrestrial broadcast system, comprising:
a data center, comprising a plurality of server devices, configured to:
receive a plurality of internet protocol (IP) flows, wherein each IP flow from the plurality of IP flows corresponds to a content provider from a plurality of content providers and a service level agreement (SLA) from a plurality of SLAs;
determine a plurality of modulated IP flows, wherein for each IP flow of the plurality of IP flows the data center is further configured to:
process the IP flow using a plurality of network functions to generate a processed IP flow, the plurality of network functions selected based on the SLA corresponding to the IP flow; and
modulate the processed IP flow using a plurality of digital signal processing virtual network functions (VNFs) to generate a modulated IP flow, wherein the modulating comprises applying a concatenation of the plurality of digital signal processing VNFs in series to the processed IP flow, wherein the plurality of digital signal processing VNFs are based on the SLA, and wherein the plurality of digital signal processing VNFs are concatenated based on the SLA;
determine a plurality of wireless spectrum allocations of a wireless spectrum pool, wherein for each IP flow of the plurality of IP flows, the data center is further configured to determine a respective wireless spectrum allocation of the IP flow based on the SLA corresponding to the IP flow and the plurality of SLAs, wherein the wireless spectrum pool comprises a plurality of licensed bands associated with the plurality of content providers; and generate a digital baseband signal based on the plurality of modulated IP flows and the plurality of wireless spectrum allocations, the plurality of wireless spectrum allocations including the respective wireless spectrum allocation.

2. The terrestrial broadcast system of claim 1, wherein the data center is further configured to execute a first virtual machine (VM) instance, the first VM instance instantiating a first VNF from the plurality of digital signal processing VNFs.

3. The terrestrial broadcast system of claim 2, wherein the data center is further configured to execute a second VM instance, the second VM instance instantiating a second VNF from the plurality of digital signal processing VNFs is instantiated on a second VM instance distinct from the first VM instance executing on the data center.

4. The terrestrial broadcast system of claim 1, wherein to generate the digital baseband signal, the data center is further configured to, for each modulated IP flow of the plurality of modulated IP flows:

map the modulated IP flow to physical layer resources of a transmission frame based on the respective wireless spectrum allocation from the plurality of wireless spectrum allocations, wherein the digital baseband signal is based on the transmission frame.

5. The terrestrial broadcast system of claim 4, further comprising a generic analog modulator configured to process the digital baseband signal into an analog passband signal.

6. The terrestrial broadcast system of claim 5, further comprising a transmitter configured to wirelessly transmit the analog passband signal.

7. The terrestrial broadcast system of claim 1, wherein the digital baseband signal comprises a very high frequency (VHF) digital baseband signal and an ultra-high frequency (UHF) digital baseband signal.

8. The terrestrial broadcast system of claim 7, further comprising:

a VHF generic analog modulator configured to process the VHF digital baseband signal into a VHF analog signal, wherein the VHF analog signal, when transmitted, occupies a portion of the VHF passband;

a UHF generic analog modulator configured to process the UHF digital baseband signal into a UHF analog signal, wherein the UHF analog signal when transmitted, occupies a portion of the UHF passband;

a first transmitter configured to wirelessly transmit the VHF analog signal; and a second transmitter configured to wirelessly transmit the UHF analog signal.

9. A terrestrial broadcast system, comprising:

a memory storing program instructions; and one or more processors, upon executing the program instructions, configured to:

receive a plurality of internet protocol (IP) flows, wherein each IP flow from the plurality of IP flows corresponds to a content provider from a plurality of content providers and a service level agreement (SLA) from a plurality of SLAs;

determine a plurality of processed IP flows, wherein for each IP flow of the plurality of IP flows, the one or more processors are further configured to:

process the IP flow using a plurality of network functions to generate a processed IP flow, wherein the plurality of network functions is selected based on the SLA corresponding to the IP flow, and wherein the SLA corresponds to the processed IP flow;

determine a plurality of wireless spectrum allocations, wherein for each IP flow of the plurality of IP flows, a wireless spectrum allocation is determined for the IP flow based on the SLA corresponding to the IP flow and the plurality of SLAs, wherein the wireless spectrum pool comprises a plurality of licensed bands associated with the plurality of content providers;

determine a plurality of modulated IP flows, wherein for each processed IP flow of the plurality of IP flows;

modulate the processed IP flow using a plurality of digital signal processing virtual network functions (VNFs) to generate a modulated IP flow, wherein the modulating comprises applying a concatenation of the plurality of digital signal processing VNFs in series to the processed IP flow, wherein the plurality of digital signal processing VNFs are based on the SLA associated with the processed IP flow, and wherein the plurality of digital signal processing VNFs are concatenated based on the SLA associated with the processed IP flow; and generate a digital baseband signal based on the plurality of modulated IP flows and the plurality of wireless spectrum allocations.

10. The terrestrial broadcast system of claim 9, wherein the one or more processors are further configured to execute a first virtual machine (VM) instance, the first VM instantiating a first VNF from the plurality of digital signal processing VNFs.

11. The terrestrial broadcast system of claim 10, wherein the one or more processors are further configured to execute a second virtual machine (VM) instance, the second VM instantiating a second VNF from the plurality of digital signal processing VNFs.

12. The terrestrial broadcast system of claim 9, wherein to generate the digital baseband signal, the one or more processors are further configured to, for each modulated IP flow of the plurality of modulated IP flows:

map the modulated IP flow to physical layer resources of a transmission frame based on the corresponding wireless spectrum allocation from the plurality of wireless spectrum allocations;

wherein the digital baseband signal is based on the transmission frame.

13. The terrestrial broadcast system of claim 12, further comprising a generic analog modulator configured to process the digital baseband signal into an analog passband signal.

14. The terrestrial broadcast system of claim 13, further comprising a transmitter configured to wirelessly transmit the analog passband signal.

15. The terrestrial broadcast system of claim 9, wherein the digital baseband signal comprises a very high frequency (VHF) digital baseband signal and an ultra-high frequency (UHF) digital baseband signal.

16. The terrestrial broadcast system of claim 15, further comprising:

a VHF generic analog modulator configured to process the VHF digital baseband signal into a VHF analog signal, wherein the VHF analog signal, when transmitted, occupies a portion of the VHF passband;

a UHF generic analog modulator configured to process the UHF digital baseband signal into a UHF analog signal, wherein the UHF analog signal when transmitted, occupies a portion of the UHF passband;

a first transmitter configured to wirelessly transmit the VHF analog signal; and a second transmitter configured to wirelessly transmit the UHF analog signal.

17. A method for generating a signal in a data center, comprising:

receiving a plurality of internet protocol (IP) flows, wherein each IP flow from the plurality of IP flows corresponds to a content provider from a plurality of content providers and a service level agreement (SLA) from a plurality of SLAs;

generating a plurality of modulated IP flows, wherein said generating comprises, for each IP flow of the plurality of IP flows:

processing the IP flow using a plurality of network functions to generate a processed IP flow, the plurality of network functions selected based on the SLA corresponding to the IP flow; and modulating the processed IP flow using a plurality of digital signal processing virtual network functions (VNFs) to generate a modulated IP flow, wherein the modulating comprises applying a concatenation of the plurality of digital signal processing VNFs in series to the processed IP flow, wherein the plurality of digital signal processing VNFs are based on the SLA, and wherein the plurality of digital signal processing VNFs are concatenated based on the SLA associated with the processed IP flow;

determining a plurality of wireless spectrum allocations by, for each IP flow of the plurality of IP flows, determining a respective wireless spectrum allocation of a wireless spectrum pool for the IP flow based on the SLA and the plurality of SLAs, wherein the wireless spectrum pool comprises a plurality of licensed bands associated with the plurality of content providers; and generating a digital baseband signal based on the plurality of modulated IP flows and the plurality of wireless spectrum allocations.

18. The method of claim 17, further comprising instantiating a first VNF from the plurality of digital signal processing VNFs in a first virtual machine (VM) instance executing on the data center.

19. The method of claim 18, further comprising instantiating a second VNF from the plurality of digital signal processing VNFs on a second VM instance distinct from the first VM instance executing on the data center.

20. The method of claim 17, wherein the generating a digital baseband signal includes, for each modulated IP flow of the plurality of modulated IP flows:

mapping the modulated IP flow to physical layer resources of a transmission frame based on the respective wireless spectrum allocation from the plurality of wireless spectrum allocations, wherein the digital baseband signal is based on the transmission frame.

* * * * *

UNITED STATES PATENT AND TRADEMARK OFFICE
CERTIFICATE OF CORRECTION

PATENT NO. : 10,652,624 B2
APPLICATION NO. : 15/480981
DATED : May 12, 2020
INVENTOR(S) : Simon et al.

Page 1 of 1

It is certified that error appears in the above-identified patent and that said Letters Patent is hereby corrected as shown below:

In the Claims

Column 22, Lines 8-9, Claim 9 please replace "to the processed IP flow:" with --to the processed IP flow;--.

Signed and Sealed this
Twenty-third Day of June, 2020

Andrei Iancu
*Director of the United States Patent and Trademark Office*